US012665710B2

(12) United States Patent
Bai et al.

(10) Patent No.: US 12,665,710 B2
(45) Date of Patent: Jun. 23, 2026

(54) TRANSMISSION CONFIGURATION INDICATOR (TCI) CONFIGURATION OF A COMPONENT CARRIER (CC)

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/063,026

(22) Filed: Dec. 7, 2022

(65) Prior Publication Data

US 2024/0195544 A1 Jun. 13, 2024

(51) Int. Cl.
*H04L 5/00* (2006.01)
(52) U.S. Cl.
CPC ............ *H04L 5/001* (2013.01); *H04L 5/0094* (2013.01)
(58) Field of Classification Search
CPC ...... H04L 5/001; H04L 5/0094; H04L 5/0023
See application file for complete search history.

(56) References Cited

U.S. PATENT DOCUMENTS

| | | | | |
|---|---|---|---|---|
| 2022/0263616 A1* | 8/2022 | Farag | .................... | H04L 5/0048 |
| 2022/0417909 A1* | 12/2022 | Zhu | ........................ | H04W 16/28 |
| 2024/0056274 A1* | 2/2024 | Cirik | ................. | H04B 7/06968 |
| 2025/0184931 A1* | 6/2025 | Prasad | ................ | H04W 52/146 |

FOREIGN PATENT DOCUMENTS

| | | | | |
|---|---|---|---|---|
| EP | 4297451 A1 | 12/2023 | | |
| WO | 2022/176090 A1 | 8/2022 | | |
| WO | WO-2023079651 A1 * | 5/2023 | ........... | H04L 5/0094 |

OTHER PUBLICATIONS

Ofinno, Unified Beam Management, Ofinno, LLC, 2021. [Online] Available: https://ofinno.com/wp-content/uploads/2021/09/Ofinno-Unified-Beam-Management-Whitepaper.pdf (Year: 2021).*
ETSI TS 138 331 V16.1.0 (Jul. 2020). [Online] Available: https://studylib.net/doc/26992491/radio-resource-control--rrc-%3B-protocol-specification-3gp . . . (Year: 2020).*
International Search Report and Written Opinion dated Mar. 13, 2024 from corresponding PCT Application No. PCT/US2023/078652.

* cited by examiner

*Primary Examiner* — Ayman A Abaza
*Assistant Examiner* — Alyssa Williams
(74) *Attorney, Agent, or Firm* — ArentFox Schiff, LLP

(57) ABSTRACT

Aspects of the disclosure are directed to transmission configuration indicator (TCI) configuration of a component carrier (CC). For example, aspects are directed to aligning TCI configurations and physical cell identifier (PCI) lists between multiple CCs. Some examples include receiving, from a serving cell, a first TCI configuration for a first CC, wherein the first TCI configuration comprises a first TCI pool comprising at least one TCI state mapped to one of a PCI of the serving cell or a PCI index corresponding to a neighboring non-serving cell. Examples may also include communicating wireless signaling between a user equipment (UE) and the serving cell via a second CC using the at least one TCI state of the first TCI pool.

25 Claims, 22 Drawing Sheets

400

420 Core Network

Backhaul link

405 Service Management and Orchestration (SMO) Framework

415 Non-Real Time RAN Intelligent Controller (RIC)

O1

A1

425 Near-Real Time RAN Intelligent Controller (RIC)

E2

E2

411 O-eNB

O1

O2

490 O-Cloud

410 CU

E2

Midhaul link

430 DU

Midhaul link

430 DU

Fronthaul link

440 RU

440 RU

440 RU

Access link

104 UE

104 UE

104 UE

104 UE

104 UE

Figure 8:
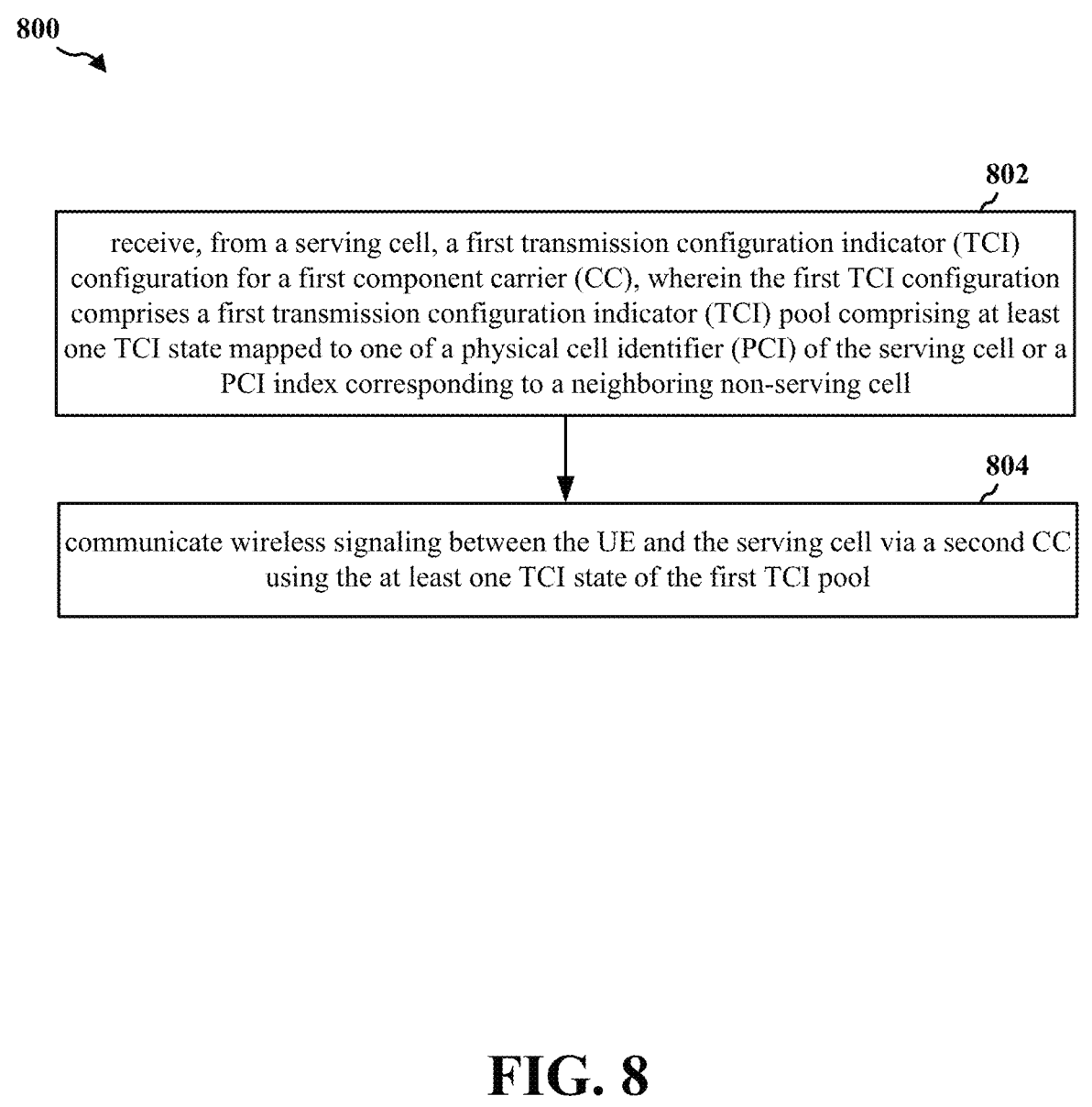

800

802 receive, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell

804 communicate wireless signaling between the UE and the serving cell via a second CC using the at least one TCI state of the first TCI pool

Figure 9:
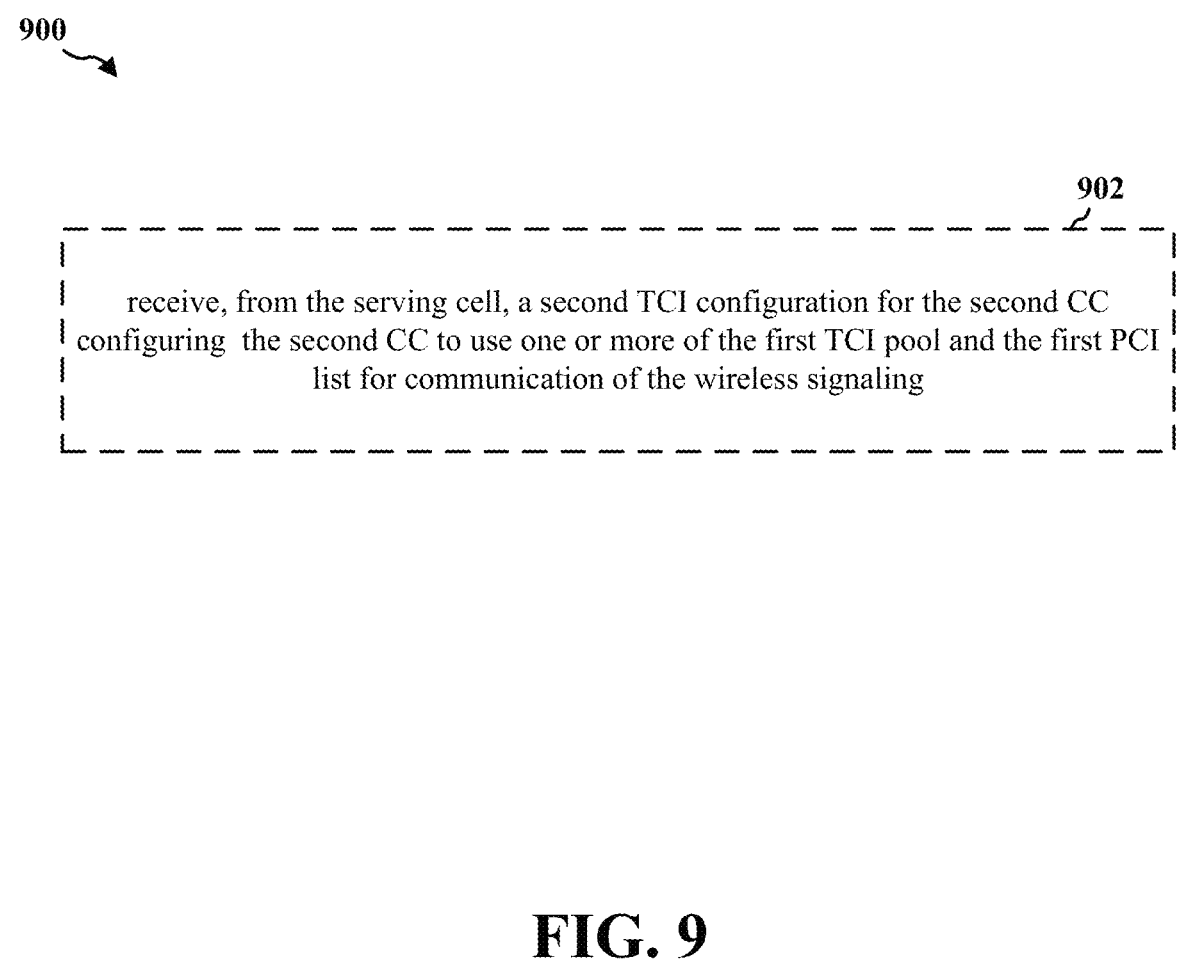

902 receive, from the serving cell, a second TCI configuration for the second CC
configuring the second CC to use one or more of the first TCI pool and the first PCI
list for communication of the wireless signaling

1002 receive, from the serving cell, a second TCI configuration for the second CC, wherein the second TCI configuration comprises the first PCI list

1102 communicate wireless signaling between the UE and the serving cell via the first CC using the second TCI pool, wherein the wireless signaling between the UE and the serving cell via the second CC is communicated via the one TCI state mapped to the PCI of the serving cell

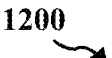

1202 configure the second CC with the first TCI pool

1204 communicate wireless signaling between the UE and the serving cell via a second CC using the at least one TCI state of the first TCI pool

1206 receive, from the serving cell, signaling activating the second TCI state for UE communications, wherein the first TCI state was previously activated

1208 if the second CC is configured with a PCI list omitting the second PCI index, or if the second CC is not configured with a PCI list, then continue to communicate wireless signaling between the UE and the serving cell via the second CC using the first TCI state instead of the second TCI state

1210 if the second CC is configured with a PCI list comprising the second PCI index, then communicate wireless signaling between the UE and the serving cell via the second CC using the second TCI state

1402 transmit, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell

1404 communicate wireless signaling between the network node and the UE via a second CC of the UE using the at least one TCI state of the first TCI pool

1502 transmit, to the UE, a second TCI configuration for the second CC configuring the second CC to use one or more of the first TCI pool and the first PCI list for communication of the wireless signaling

1602 transmit, to the UE, a second TCI configuration for the second CC of the UE, wherein the second TCI configuration configures the second CC for intra-cell beam management (BM), and wherein the at least one TCI state is mapped to the PCI of the serving cell and the first TCI configuration configures the first CC for intra-cell beam management (BM) based on the second CC being configured for intra-cell BM

1702 transmit, to the UE, a second TCI configuration for the second CC of the UE, wherein the second TCI configuration configures the second CC with a second PCI list enabling inter-cell BM and including a second number of PCI indices, wherein the first number of PCI indices is less than or equal to the second number of PCI indices

1802 transmit, to the UE, a second TCI configuration for the second CC, wherein the second TCI configuration configures the second CC with the first PCI list

1902 communicate wireless signaling between the UE and the serving cell via the first CC using the second TCI pool, wherein the wireless signaling between the UE and the serving cell via the second CC is communicated via the one TCI state mapped to the PCI of the serving cell

2102 transmit, to the UE, a second TCI configuration for the second CC comprising a second PCI list, wherein the wireless signaling communicated between the network node and the UE is performed using the first TCI pool and the first PCI list instead of the second PCI list

FIG. 21

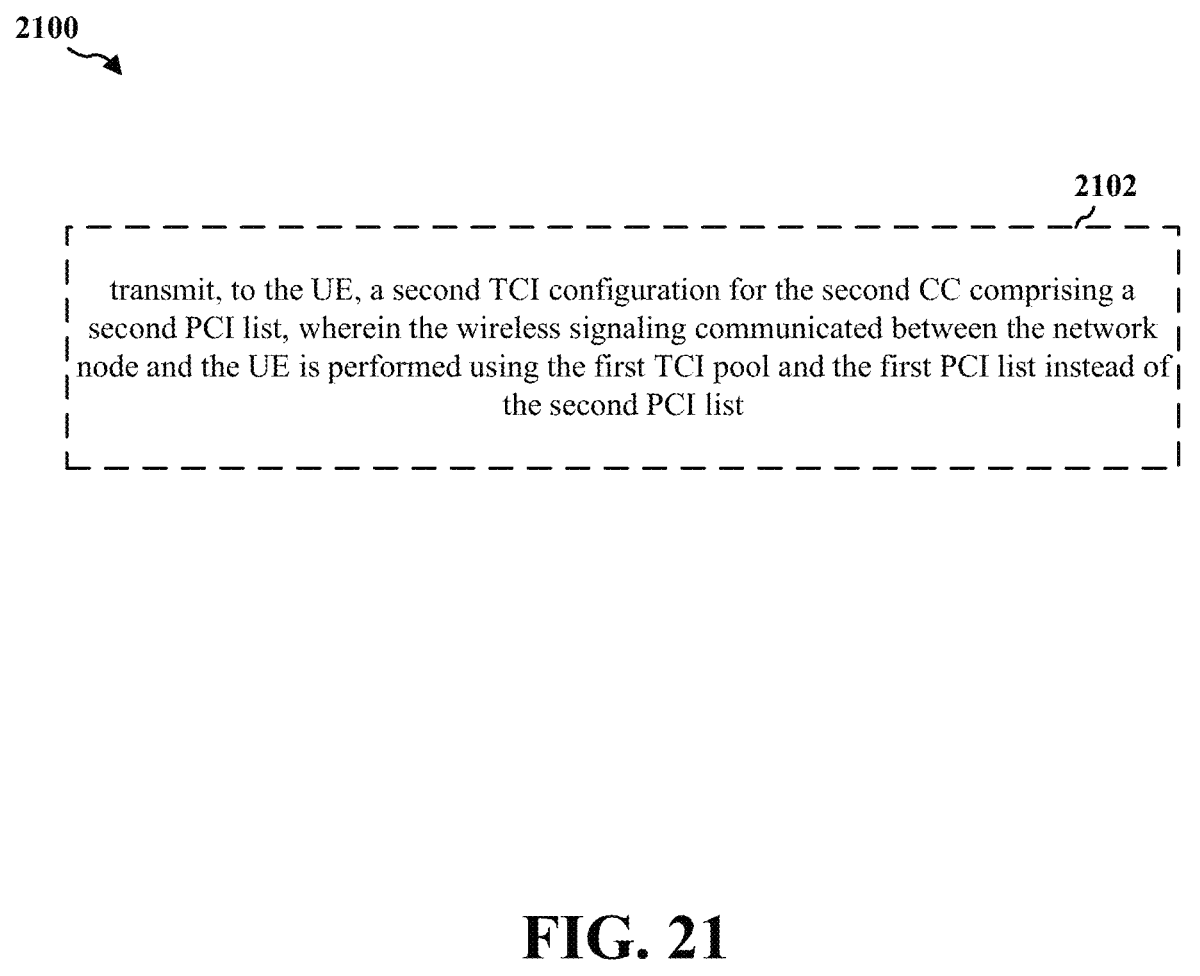

TRANSMISSION CONFIGURATION INDICATOR (TCI) CONFIGURATION OF A COMPONENT CARRIER (CC)

BACKGROUND

Technical Field

The present disclosure generally relates to communication systems, and more particularly, to cross-configuration of a component carrier (CC) with transmission configuration indicator (TCI) information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method of wireless communication at a user equipment (UE). In some examples, the method includes receiving, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the method includes communicating wireless signaling between the UE and the serving cell via a second CC using the at least one TCI state of the first TCI pool.

Certain aspects are directed to a method of wireless communication at a network node configured as a serving cell for a user equipment (UE). In some examples, the method includes transmitting, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the method includes communicating wireless signaling between the network node and the UE via a second CC of the UE using the at least one TCI state of the first TCI pool.

Certain aspects are directed to a user equipment (UE) configured for wireless communication. The UE may include a memory comprising instructions one or more processors configured to execute the instructions. In some examples, the instructions may cause the one or more processors of the UE to receive, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the instructions may cause the one or more processors of the UE to communicate wireless signaling between the UE and the serving cell via a second CC using the at least one TCI state of the first TCI pool.

Certain aspects are directed to a network node configured as a serving cell for wireless communication with a user equipment (UE). The network node may include a memory comprising instructions and one or more processors configured to execute the instructions. In some examples, the instructions may cause the one or more processors of the network node to transmit, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the instructions may cause the one or more processors of the UE to communicate wireless signaling between the network node and the UE via a second CC of the UE using the at least one TCI state of the first TCI pool.

Certain aspects are directed to an apparatus for wireless communication. In some examples, the apparatus includes means for receiving, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the apparatus includes means for communicating wireless signaling between the UE and the serving cell via a second CC using the at least one TCI state of the first TCI pool.

Certain aspects are directed to an apparatus for wireless communication at a network node. In some examples, the apparatus includes means for transmitting, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the apparatus includes means for communicating wireless signaling between the network node and the UE via a second CC of the UE using the at least one TCI state of the first TCI pool.

Certain aspects are directed to a non-transitory computer-readable medium having instructions stored thereon that, when executed by a UE, cause the UE to perform operations include receiving, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the operations include communicating wireless signaling between the UE and the serving cell via a second CC using the at least one TCI state of the first TCI pool.

Certain aspects are directed to a non-transitory computer-readable medium having instructions stored thereon that, when executed by network node configured as a serving cell for a user equipment (UE), cause the network node to perform operations including transmitting, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. In some examples, the operations include communicating wireless signaling between the network node and the UE via a second CC of the UE using the at least one TCI state of the first TCI pool.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8-12 are flowcharts illustrating example methods of wireless communication at a UE.

FIGS. 14-21 are flowcharts illustrating example methods of wireless communication at a base station.

DETAILED DESCRIPTION

Figure 1:
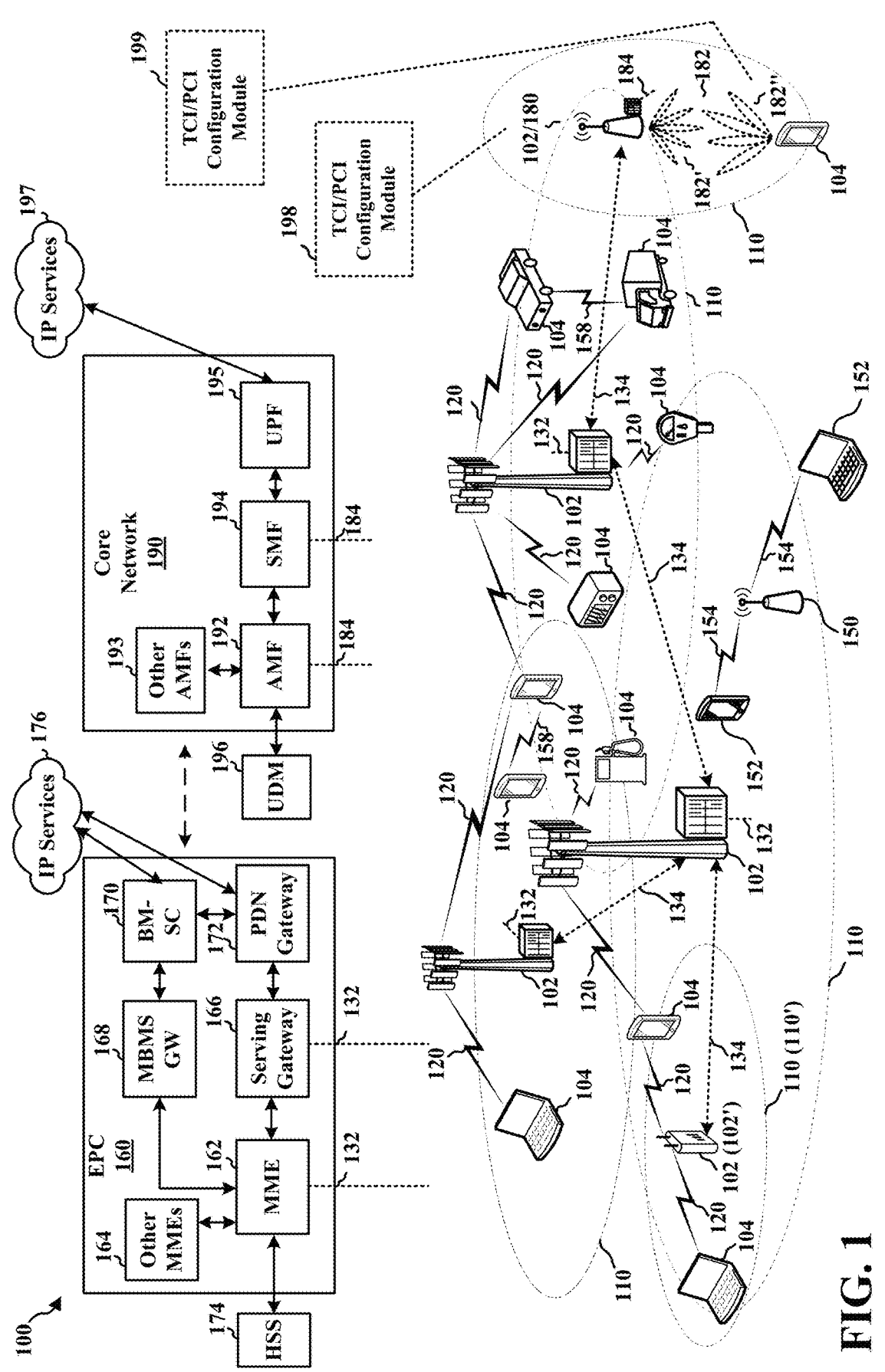
FIG. 1 is a diagram illustrating an example of a wireless communications system and an access network.

The detailed description set forth below in connection with the appended drawings is intended as a description of various configurations and is not intended to represent the in only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain aspects, a user equipment (UE) may be configured with multiple component carriers (CCs). For example, the UE may communicate using carrier aggregation (CA), wherein each aggregated carrier is referred to as a CC. Accordingly, CA may increase the bandwidth for the UE by combining multiple carriers. In some examples, a CC may include one or more bandwidth parts (BWPs) with each BWP being a part of a CC configured for a cell that is used for a UE at a specific moment of operation.

In some examples, a UE may be configured (e.g., by a network node such as a gNB/base station during radio resource control (RRC) configuration) with a pool of transmission configuration indicator (TCI) states for a particular CC and/or BWP. In some scenarios, the network node may configure a "reference CC" with the pool of TCI states without configuring any other CCs of the UE with a TCI pool. When a particular BWP or CC is not configured with a TCI pool, the UE may use the TCI pool of the reference CC for communications via the particular BWP or CC. In other words, the UE will borrow the TCI pool configured for the reference CC and apply it to the BWP or CC that were not configured with a TCI pool.

Each TCI state of a TCI pool may correspond to a particular beam direction (e.g., spatial direction). Thus, the TCI pool may be used for aspects of beam management (BM). In some examples, switching from one beam to another within a particular cell may be referred to as intra-cell BM. Intra-cell BM is applicable when UE is in connected mode and can be done through L1/L2 procedures. On the other hand, handover from one cell to another cell may be referred to as inter-cell BM, and may use an L3 procedure. Each CC of the UE may be configured for a certain type of BM: intra-cell or inter-cell. Under the umbrella of intra-cell BM and inter-cell BM, other types of CC BM may include inter/intra-cell single transmission/ reception point (STRP), inter/intra-cell multiple downlink control information (mDCI) single timing advance group (sTAG), inter/intra-cell multiple TAG (mTAG), intra-cell single DCI (sDCI), etc.

For inter-cell BM, the TCI pool may be defined, in part, by synchronization signal blocks (SSBs) from cells other than the current serving cell. For example, the TCI pool may include one or more TCI states listed according to a TCI index. The TCI pool may also include a list of one or more physical cell identifier (PCI) indices with each PCI index corresponding to one of the TCI indices. In turn, the PCI index may correspond to a particular PCI. Thus, the UE may use two lists for TCI mapping (e.g., TCI pool) and PCI mapping (e.g., PCI list) of a corresponding CC configured for inter-cell BM.

Thus, the UE can perform TCI configuration across more than one CC even if the network node only configured one CC with a TCI pool. For example, the network node may provide the UE with a TCI configuration that includes a TCI pool, and the TCI configuration may configure a reference CC but no other CCs. Here, the UE may use the TCI pool of the reference CC for a target CC that was not specifically configured by the network node. However, issues may occur if the reference CC and the target CC are configured as different BM types. For example, the reference CC and the target CC may each be configured with a non-serving cell PCI list that is different relative to the other, or one CC may not be configured with a PCI list at all (e.g., if the reference CC is configured for inter-cell BM it may use a PCI list, while the target CC is configured for intra-cell BM and does not use a PCI list).

Accordingly, in certain aspects, if a target CC is not configured with a PCI list (e.g., target CC is configured for intra-cell BM), then the reference CC shall also be configured for intra-cell BM. In such a configuration, neither the reference CC nor the target CC are configured with a PCI list because neither are configured for inter-cell BM. As such, if the reference CC shares its TCI pool with the target CC, the TCI pool entries may not include an index mapping a TCI to a non-serving cell PCI because neither CC requires a PCI for a non-serving cell.

In certain aspects, if a target CC is configured for inter-cell BM, then the reference CC shall also be configured for inter-cell BM with a PCI list that is either: (i) not configured (e.g., length zero PCI list), or (ii) configured but shorter than that of the target CC PCI list (e.g., target CC always has longer or equal PCI list relative to the PCI list of the reference CC). Alternatively, the network may require that the target CC and reference CC each be configured with the same PCI list or have different PCI lists that include the same number of entries (e.g., the PCI list of the reference CC is the same length of the PCI list of the target CC, although one or more entries may be different relatively to the other PCI list.

In certain aspects, a reference CC may be configured with two TCI pools: a first TCI pool for inter-cell BM and a second TCI pool for intra-cell beam management (e.g., the second TCI pool may include one or more TCI for communication between the UE and the current serving cell). Thus, the UE may be configured with a PCI list having one or more PCIs mapped to the TCIs of the first TCI pool, but no PCI list similarly associated with the second TCI pool. Accordingly, if the reference CC is configured for inter-cell BM, then reference CC may use the first TCI pool while the target CC (which is configured for intra-cell BM) may use the second TCI pool. As such, the reference CC is configured with an additional TCI pool so that the reference CC can share the additional TCI pool with another CC that is not configured for inter-cell BM.

In certain aspects, the reference CC may be configured with a TCI pool having one or more PCI indices mapping a TCI to a PCI of a PCI list (e.g., the reference CC is configured for inter-cell BM). However, if the target CC is also configured for inter-cell BM and it borrows the TCI pool from the reference CC, but the target CC is configured with a shorter PCI list than the reference CC, then some of the PCI indices of the reference CC would be undefined from the perspective of the target CC. That is, one or more PCI indices in the TCI pool borrowed from the reference CC may not map to a PCI in the target CC's PCI list. In this example, the target CC may ignore the undefined PCI indices of the borrowed TCI pool. In other words, the target CC may ignore a TCI of the borrowed TCI pool that has a corresponding PCI index that does not map to a PCI of the target CC's PCI list. In another example, if the target CC is not configured with a PCI table, then the target CC may ignore any value in a PCI index of the TCI pool.

As discussed, the target CC of a UE may borrow a TCI pool that another CC (e.g., reference CC) of the same UE, but the PCI index list in the borrowed TCI pool may be meaningless to the target CC if it does not also borrow the corresponding PCI list. Accordingly, in certain aspects, the target CC may borrow both a TCI pool and a PCI list that corresponds to the PCI index of the TCI pool. In this example, the target CC and the reference CC may use the same TCI pool and PCI list. In some examples, the target CC may use a PCI list from the reference CC if the target CC is configured with a TCI pool. However, if the target CC has neither a TCI pool or a PCI list, then the target CC may borrow both from the reference CC. In other words, in some examples, the target CC may either borrow both the PCI list and TCI pool from the reference CC, or neither. Similarly, the target CC may not borrow a PCI list from the reference CC if the target CC is already configured with a TCI pool. In some examples, the network may configure the target CC with a TCI pool that ignores any additional PCI list that the target CC is not already configured with. In some examples, the target CC may already be configured with a PCI list. In such an example, the target CC may borrow additional entries from another PCI list borrowed by the reference CC (e.g., target CC already has a PCI list that is shorter than another PCI list used by the reference CC) but ignore for the TCI pool.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (cNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a TCI/PCI configuration module 199 configured to receive, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; and communicate wireless signaling between the UE and the serving cell via a second CC using the at least one TCI state of the first TCI pool.

Referring again to FIG. 1, in certain aspects, the network node (e.g., base station 102/180) may include a TCI/PCI configuration module 198 configured to transmit, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; and communicate wireless signaling between the network node and the UE via a second CC of the UE using the at least one TCI state of the first TCI pool.

Figures 2A, 2B, 2C, 2D:
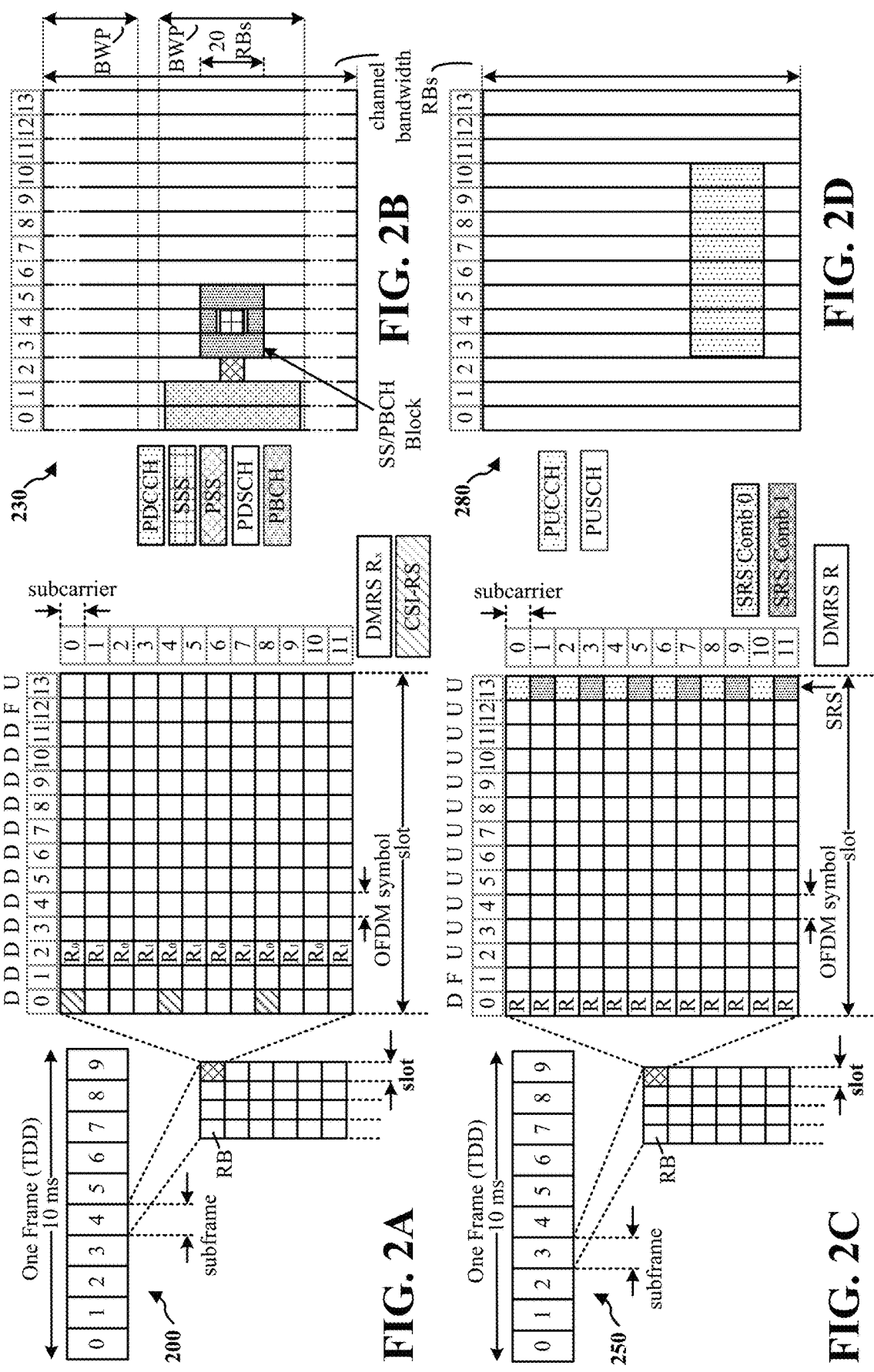
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 0x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
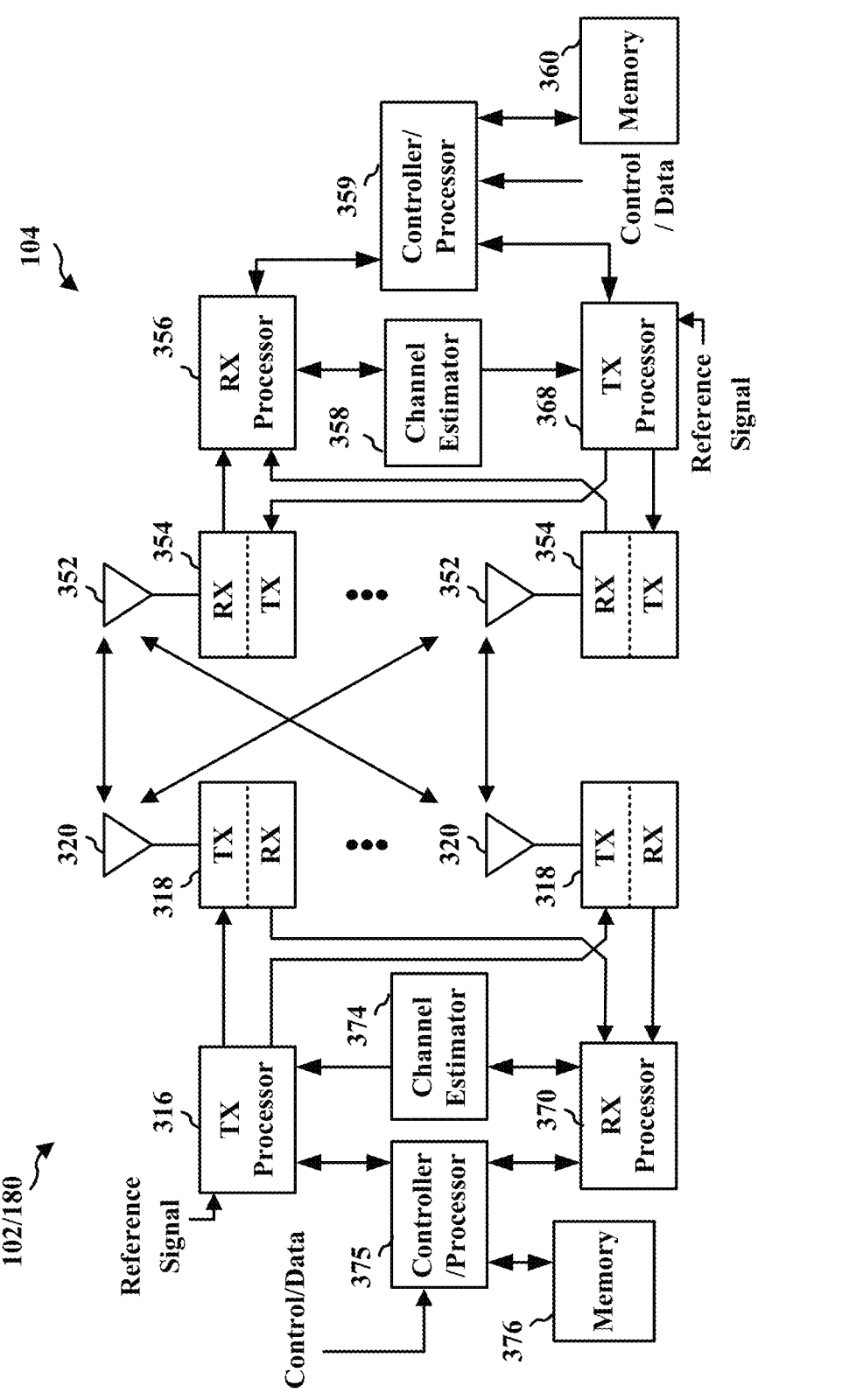
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TCI/PCI configuration module 199 of FIG. 1.

At least one of the TX processor 316, the RX processor 370, and the controller/processor 375 may be configured to perform aspects in connection with the TCI/PCI configuration module 198 of FIG. 1.

Figure 4:
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As defined herein, a "network node" may include the aggregate of the units illustrated in FIG. 4, or one or more of the units of FIG. 4.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Still referring to FIG. 4, a DU 430 or CU 410 may configure a set of cells that support layer 1 (L1) and layer 2 (L2) UE 104 mobility. The set of cells may include the CU 410, one or more DUs 430, and a plurality of RUs 440, wherein one or more of the plurality of RUs 440 are managed by the same DU 430. Here, the CU 410 and/or the DU 430 may configure a set of RUs 440 such that the CU 410 and the DU 430 manage each cell associated with each RU 440 (e.g., a set of cells). In this example, each cell in the set of cells includes the CU 410, the DU 430, and one of the plurality of RUs 440. For example, the CU 410, the DU 430, and a first RU may make up a first cell of the plurality of cells, the CU 410, the DU 430, and a second RU may make up a second cell of the plurality of cells. It should be noted that although FIG. 4 illustrates three RUs in the cell set, any suitable number of RUs may be used.

In this example, each cell of the set of cells support L1 and L2 communications between the plurality of RUs 440 and the UE 104, and each cell may use the same or a different carrier frequency relative to another cell. Each cell may be configured as a primary cell (PCell) or a special cell (sPCell) and may use L1/L2 signaling to update a PCell/sPCell in the set of cells. Thus, one or more of the cells in the cell set may be activated and used for data and control communications with one or more UEs via L1/L2 signaling.

As used herein, an "activated/active cell" is a cell that the UE 104 may communicate (e.g., transmit and receive wireless signals) data and control signals with. In some examples, the UE 104 may be configured to support multiple activated cells, or only a single activated cell. In the single activated cell case, the activation of a cell may be made with the assumption that another activated cell will be deactivated after a handover.

As used herein, a "deactivated cell" may relate to a cell with which the UE 104 cannot communicate data and control signals. For example, a deactivated cell may not be used for communication with the UE 104, but the deactivated cell may be activated via L1/L2 signaling and used as a PCell/sPCell once activated.

Examples of Cross CC TCI Configuration for Intra-Cell and Inter-Cell BM

Figure 5:
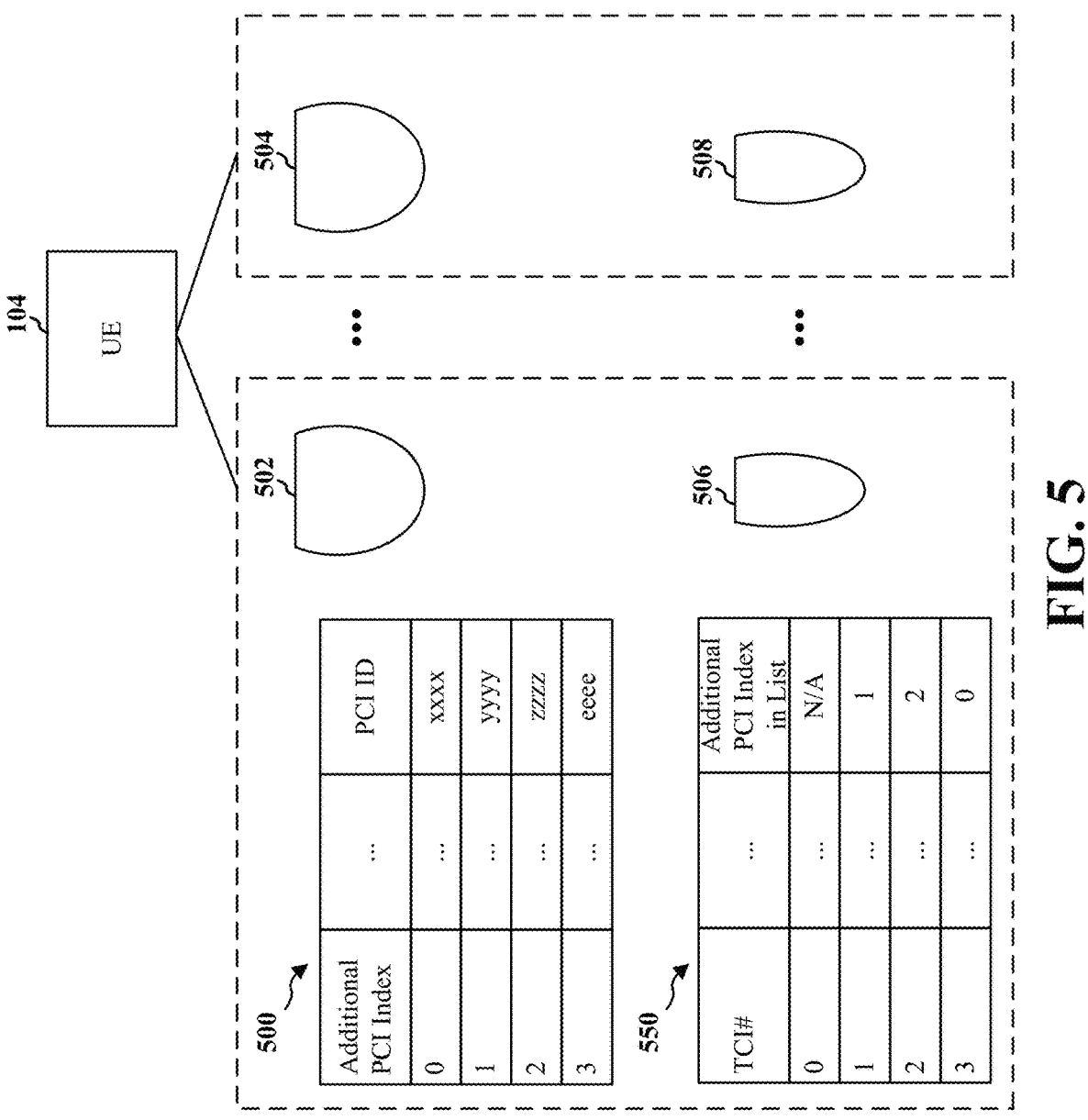
FIG. 5 is a block diagram conceptually illustrating an example of a UE configured with multiple component carriers (CCs).

FIG. 5 is a block diagram conceptually illustrating an example of a UE 104 configured with multiple CCs. As illustrated, the UE 104 is configured with a first CC 502 and a second CC 504. Although not shown, the UE 104 may be configured with additional CCs. Each CC may have a corresponding one or more BWPs. Here, the first CC 502 has a corresponding first BWP 506, and the second CC 504 has a corresponding second BWP 508.

Here, the first CC 502 is configured with a TCI pool 550 and a PCI list 500, provided by a network node (e.g., network node 102/180 of FIG. 1), while the second CC 504 is not configured with either of a TCI pool or PCI list. The first CC 502 may be configured for inter-cell BM, while the second CC 504 may be configured for intra-cell BM. The TCI pool may correspond to the first BWP 506, and define a beam direction for the first BWP. For example, the TCI pool 550 may also include a column containing a reference signal that corresponds to each TCI state, wherein each reference signal is associated with a different beam direction. A TCI pool may be configured for each BWP of a CC via the network node (e.g., during RRC configuration). CCs and BWPs that are not configured with a TCI pool may use a TCI pool of a reference CC (e.g., the first CC 502).

In this example, the TCI pool includes a first column (e.g., TCI #) containing entries corresponding to four TCI states: 0, 1, 2, 3. The TCI pool 550 also includes a second column (e.g., Additional PCI Index in List) containing an index entry corresponding to a third column (e.g., Additional PCI Index) contained in the PCI list 500. Here, the first entry of the second column is "N/A" because TCI #0 is a TCI state of the current serving cell. The remaining PCI indices correspond to TCI states of non-serving cells (e.g., neighboring cells). The PCI list 500 may include a list of PCIs (e.g., identities of neighboring, non-serving cells) in a fourth column (e.g., PCI ID) that correspond to the indices in the third column. Accordingly, the PCI indices provide a mapping between the TCI states of the TCI pool 550 and the PCIs of the PCI list.

If a UE includes a CC configured for inter-cell BM, the UE may monitor reference signals (e.g., synchronization signal blocks (SSBs)) of neighboring cells and report the quality of the neighboring cell(s) signals of the to the current serving cell (e.g., network node). Thus, if a signal of a neighboring cell (e.g., non-serving cell) is of a higher quality relative to the current serving cell, the UE has a TCI pool that can allow the UE to switch serving cells to the neighboring cell relatively quickly. As noted, the current serving cell may configure the UE with the TCI pool 550 and the PCI list.

Here, the second BWP 508 (and in some examples, other BWPs) of the second CC 504 may use the TCI pool 550 of the first BWP 506 (e.g., reference BWP) for communication. However, the second column of the TCI pool will be undefined from the perspective of the second BWP 508 and the second CC 504 because the second CC is not configured with the corresponding PCI list 500. In other words, because the second CC 504 is not configured with the PCI list, the second column of the TCI pool will be undefined information.

Figure 6:
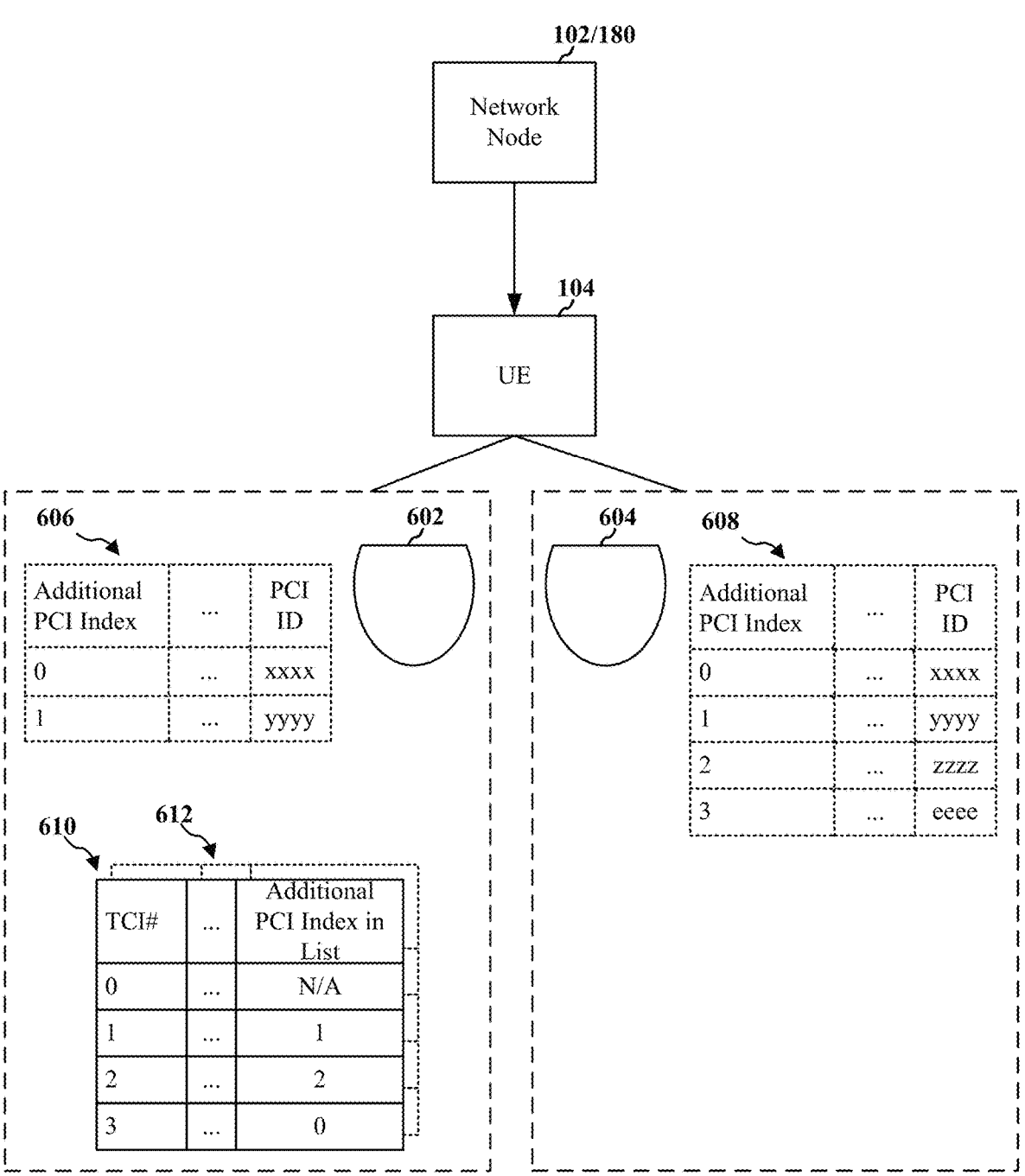
FIG. 6 is a block diagram conceptually illustrating an example of multiple CCs configured at a UE.

FIG. 6 is a block diagram conceptually illustrating an example of multiple CCs configured at a UE 104. In this example, the multiple CCs include a first CC 602 and a second CC 604. The first CC 602 is configured with a first TCI pool 610 and optionally configured with a first PCI list 606 that contains two entries (e.g., PCI indices 0 and 1). The second CC 604 is not configured with a TCI pool, and is optionally configured with a second PCI list 608 that contains four entries (e.g., PCI indices 0, 1, 2, and 3). Thus, the first CC 602 is configured with a shorter PCI list relative to the second CC 604. In this example, the first CC 602 is a reference CC and the second CC is a target CC. That is, the first CC 602 is configured with a TCI pool that the second CC 604 may use because it does not have its own TCI pool.

Initially, a network node operating as a serving cell for the UE 104 may transmit a first TCI configuration to the UE. The first TCI configuration may function to configure the first CC 602 with the first TCI pool 610. Here, the first TCI pool 610 includes four TCI states (e.g., states 0, 1, 2, 3) and an "Additional PCI Index in List" including a corresponding PCI index for each TCI state. There is no PCI index associated with TCI state 0 because that TCI state corresponds to the current serving cell, while TCI states 1-3 each correspond to a separate neighboring non-serving cell. Although the PCI indices in the "Additional PCI Index in List" map to PCI IDs via the first PCI list 606, the first CC 602 may not be configured with a PCI list. Thus, in this example, TCI state 0 is mapped to PCI of the serving cell, and TCI states 1-3 are each mapped to a PCI index corresponding to a neighboring non-serving cell.

In an example where the first CC 602 is configured with the first PCI list 606, the serving cell may include the first PCI list 606 in the first TCI configuration message sent to the UE 104. Similarly, in an example where the second CC 604 is configured with the second PCI list 608, the serving cell may transmit a second TCI configuration message to the UE, wherein the second TCI configuration functions to configure the second CC with the second PCI list 608.

In some examples, the serving cell may transmit a second TCI configuration message to the UE, wherein the second TCI configuration functions to configure the second CC to use the first TCI pool 610 and/or the first PCI list 606 for communications between the UE 104 and the serving cell via the second CC 604.

In certain aspects, the serving cell may configure the CCs of the UE 104 according to one or more rules. For example, if the serving cell does not configure the second CC 604 for inter-cell BM (e.g., if the serving cell does not provide the target CC with a PCI list) but rather for intra-cell BM, then the serving cell must also configure the first CC 602 (e.g., the reference CC) for intra-cell BM. Thus, in this example the first TCI configuration message may provide the first CC 602 with the first TCI pool 610 and configure the first CC 602 for intra-cell BM based on the second TCI configuration message configuring the second CC 604 for intra-cell BM. Accordingly, both CCs would be configured for intra-cell BM, and the first CC 602 would share its TCI pool with the second CC 604.

In some examples, the serving cell may configure CCs according to another rule, whereby if the serving cell configures the target CC (e.g., the second CC 604) with a PCI list (e.g., second PCI list 608), then the serving cell shall configure the reference CC (e.g., the first CC 602 configured with the first TCI pool 610) with a PCI list (e.g., first PCI list

606) that has less than or equal to the number of entries of the second PCI list. In other words, if the service cell configures the second CC 604 for inter-cell BM with the second PCI list 608, then the serving cell shall either not configure the first CC 602 with a PCI list (e.g., configure the first CC 602 for intra-cell BM) or configure the first CC 602 with a PCI list that does not have more entries than the second PCI list 608. Thus, as illustrated, the second CC 604 is configured with a second PCI list 608 (e.g., via the second TCI configuration message) enabling inter-cell BM and including PCI indices 0, 1, 2, and 3, and the first TCI configuration functions to configure the first CC 602 with the first PCI list 606 including PCI indices 0 and 1. Accordingly, the first PCI list 606 has fewer PCI indices than the second PCI list 608. Alternatively, the serving cell may configure the second CC 604 with the second PCI list 608, thereby enabling inter-cell BM at the second CC 604, but omit any PCI list in the configuration of the first CC 602. The omission of a PCI list configuration of the first CC 602 may be based on the second CC 604 being configured with the second PCI list 608. That is, if the serving cell configures the second CC 604 with a PCI list, it shall not configure the first CC 602 (e.g., the reference CC with the TCI pool) with a PCI list.

In some examples, the serving cell may configure the CCs according to another rule, whereby the serving cell configures both the target CC and the reference CC with the same PCI list. Thus, if the serving cell determines to configure the second CC 604 with the second PCI list 608 via the second TCI configuration message, then the serving cell may configure the first CC 602, via the first TCI configuration message, with both the first TCI pool 610 and the first PCI list 606, wherein the first PCI list 606 is identical to the second PCI list 608 (e.g., same number of entries, and same entry values).

In certain aspects, the network node of the serving cell may configure the UE 104 according to another rule, via the first TCI configuration message, with multiple TCI pools for the first CC 602, wherein the multiple TCI pools include a second TCI pool 612 and the first TCI pool 610. In this example, one of the TCI pools may be active for the first CC 602, while the other TCI pool(s) remain inactive for the first CC 602 and are used by other CCs (e.g., target CCs). In this example, the second TCI pool 612 may be configured for intra-cell BM and include at least one TCI state mapped to the PCI of the serving cell, while the first TCI pool 610 is configured for inter-cell BM and comprises at least one TCI state (e.g., TCI state 1) mapped to a PCI index (e.g., additional PCI index in list 1) corresponding to a neighboring non-serving cell (e.g., PCI ID yyyy). In this example, communications between the UE 104 and the network node 102 may be performed via the first CC 602 using a TCI state from the first TCI pool 610 or the second TCI pool 612, and communications between the UE and the serving cell may be performed via the second CC 604 using a TCI state from the other of the first TCI pool 610 or the second TCI pool 612 (e.g., if the intra-cell BM TCI pool is used, the TCI state is mapped to the PCI of the serving cell).

In certain aspects, the network node 102 and the UE 104 may ignore TCI states of a TCI pool if the TCI states have a corresponding Additional PCI Index in List that is undefined in a PCI list. For example, the network node 102 may configure the first CC 602 of the UE 104, via the first TCI configuration, with a first TCI pool 610 and a first PCI list 606 that contains: (i) a first PCI (e.g., PCI ID xxxx) corresponding to a first PCI index (e.g., additional PCI index 0) mapped to a first TCI state (e.g., TCI #3) of the first TCI pool 610, and (ii) a second PCI (e.g., PCI ID yyyy) corresponding to a second PCI index (e.g., additional PCI index 1) mapped to a second TCI state (e.g., TCI #1) of the first TCI pool 610. The network node 102 may then transmit a second TCI configuration message to the UE 104 configuring the second CC 604 to use the first TCI pool 610. The network node may also activate a first TCI state (e.g., TCI #0) for the first CC 602 and the second CC 604 to use for communications between the UE 104 and network node 102.

Thereafter, the network node 102 of the serving cell may transmit, to the UE 104, signaling activating a second TCI state (TCI #2) for UE communications, thereby deactivating the first TCI state. However, because the first CC 602 is configured with the first PCI list 606 that does not contain a PCI index "2," the first CC 602 may ignore the activation and continue to use the most recent previously-activated TCI state; in this example, the first TCI state (e.g., TCI #0).

In some examples, if either of the first CC 602 and/or the second CC 604 is configured with a PCI list omitting the second PCI index, or if either CC is not configured with a PCI list, then the UE 104 may continue to communicate wireless signaling with the network node 102 via either CC using the first TCI instead of the second TCI state. That is, either CC may ignore the subsequently activated TCI state if the corresponding PCI list does not contain the PCI index associated with the subsequently activated TCI state. However, if either of the first CC 602 and/or the second CC 604 is configured with a PCI list comprising the second PCI index, then the UE may use one or both CCs to communicate wireless signaling.

Figure 7:
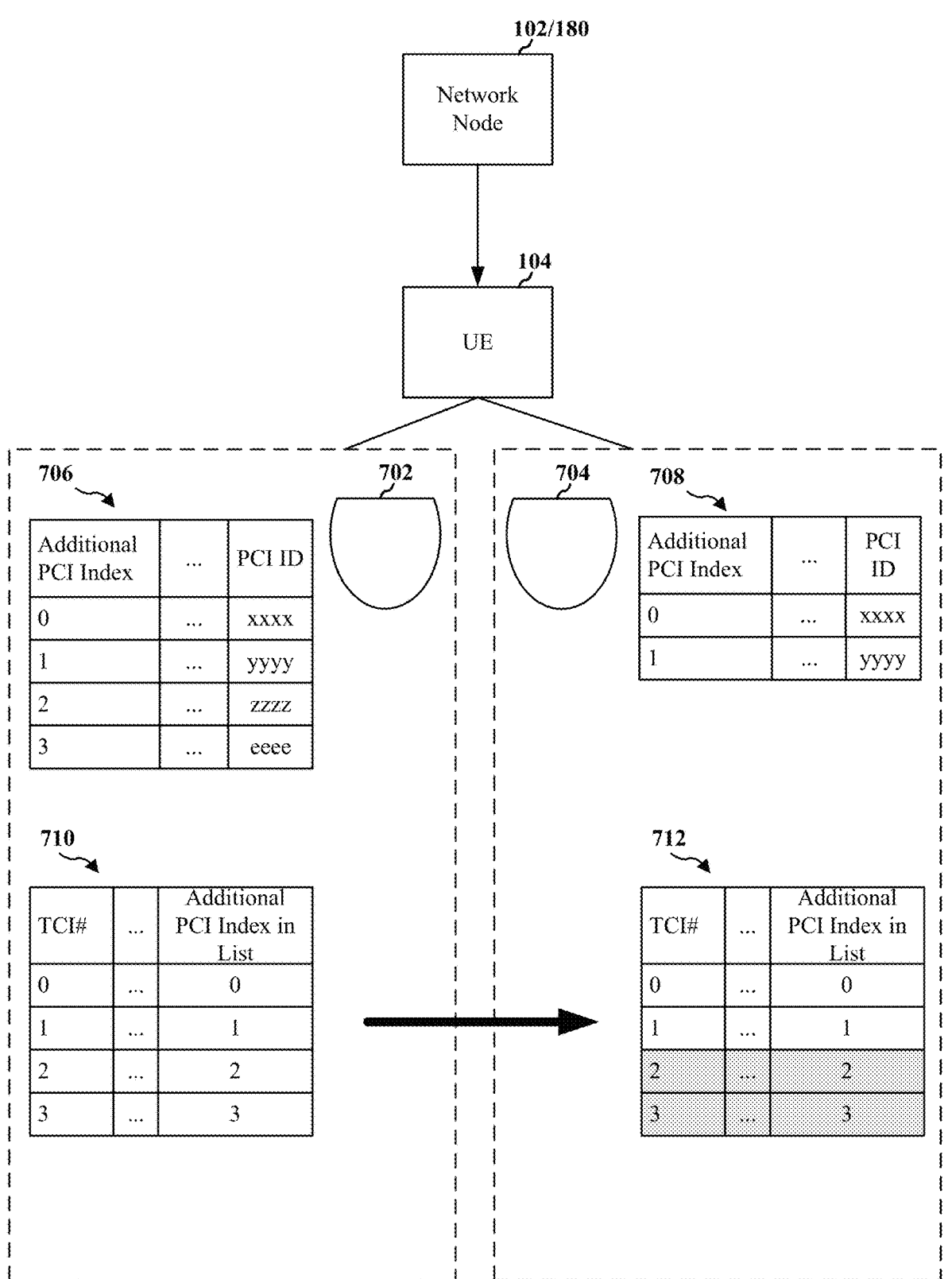
FIG. 7 is a block diagram conceptually illustrating an example of a UE including a first CC (e.g., reference CC) and a second CC (e.g., target CC).

Referring now to FIG. 7, an example is illustrated where the UE includes a first CC 702 (e.g., reference CC) and a second CC 704 (e.g., target CC). In a first TCI configuration message to the UE 104, the network node 102 may configure the first CC 702 with a first PCI list 706 and a first TCI pool 710. The first PCI list 706 includes four PCI ID entries (e.g., 0, 1, 2, 3) each mapped to a PCI ID (e.g., xxxx, yyyy, zzzz, and eeee, respectively). The first TCI pool 710 includes four TCI states (0, 1, 2, and 3) each mapped to a PCI index (e.g., 0, 1, 2, and 3, respectively) corresponding to an index value in the first PCI list 706. Thus, TCI state 0 is mapped to PCI ID xxxx, TCI state 1 is mapped to PCI ID yyyy. TCI state 2 is mapped to PCI ID zzzz, and TCIU state 3 is mapped to PCI ID eeee.

In a second TCI configuration message to the UE, the network node 102 may configure the second CC 704 with a second PCI list 708 and an indication that the second CC 704 may use the first TCI pool 710 of the first CC 702. In this example, the second PCI list 708 contains fewer PCI IDs relative to the first PCI list 706 (e.g., PCI IDs xxxx and yyyy), and the first TCI pool 710 includes PCI indices (e.g., 2 and 3) that are undefined in the second PCI list 708. Thus, in this example, because the second CC 704 may use the first TCI pool 710, and because the first TCI pool 710 includes undefined PCI indices from the perspective of the second CC 704 that uses the second PCI list 708, the UE 104 may ignore the undefined entries of the first TCI pool 710 resulting in a modified first TCI pool 712 that may be used by the second CC 704. In this example, the second CC 704 may ignore TCI states 2 and 3.

In some examples, the multiple CCs of the UE may be grouped in a list. For example, one list of CCs may include the first CC 702 and the second CC 704. The list may also include other CCs, but for brevity this example will focus on the first and second CCs. The network node 102 may transmit a first message (e.g., MAC-CE) to the UE 104, wherein the first message is configured to activate one or more TCIs for each CC on the list of CCs. In one example, the first message may be directed to the first CC 702, but because the second CC 704 is on the same list as the first CC 702, the second CC 704 may activate the same TCI(s) as those indicated by the first message to the first CC 702. Accordingly, the CCs on the list of CCs are unified in their activation of a particular one or more TCI states.

The network node 102 may also transmit a second message (e.g., DCI) directed to one of the CCs (e.g., first CC 702) in the list of CCs. The second message may be configured to select one of the activated TCI states that the first CC 702 may use for communication. Because the first CC 702 is on the list of CCs, the selection of the TCI state may also apply to all other CCs (e.g., second CC 704) of the list of CCs. However, as illustrated, the second PCI list 708 of the second CC 704 does not have all of the PCI indices contained in the first TCI pool 710. As such, if the first message and second message activate and select a TCI state mapped to an undefined PCI index form the perspective of the second CC 704, the second CC 704 may not be able to use the activated and selected TCI state (e.g., the UE 104 may be configured such that the second CC 704 ignores TCI states associated with undefined PCI indices).

To resolve this issue, the second CC 704 may ignore TCI activation/selection if the TCI state has an undefined PCI index. For example, the second CC 704 may continue to use a previously (e.g., most recent) activated and selected TCI state. That is, the second CC 704 may continue to use a current TCI state and ignore a newly activated/selected TCI state that is undefined.

Referring back to FIG. 6, in certain aspects, the PCI list configuration of a target CC (e.g., the second CC 604) may be determined by the reference CC (e.g., the first CC 602). In one example, the network node 102 may configure the first CC 602 of the UE 104 (e.g., via the first TCI configuration message) with the first PCI list 606 that includes a first PCI (e.g., PCI ID xxxx) of a non-serving cell, and the first TCI pool 610. The network node 102 may also configure the second CC 604 (e.g., via a second TCI configuration message) to use the first PCI list 606 and the first TCI pool 610 of the first CC 602 for its communications. That is, the UE 104 may share the first TCI pool 610 and first PCI list 606 between the first CC 602 and the second CC 604. In some examples, the second CC 604 may only use the first PCI list 606 of the first CC 602 if the second CC 604 is already configured with a TCI pool (e.g., the second CC 604 is configured with a dedicated TCI pool separate from the first TCI pool 610 or if the second CC 604 is configured to use the first TCI pool 610 of the first CC 602). In some examples, the second CC 604 may only be configured to share the first TCI pool 610 and first PCI list 606 if the second CC 604 is not already configured with a dedicated TCI pool or PCI list. In another example, the target CC (e.g., the second CC 604) may not be configured by the serving cell with a TCI pool, but the serving cell does configure it with a PCI list (e.g., second PCI list 608). In this example, the second CC 604 may borrow both the first TCI pool 610 and the first PCI list 606 from the reference CC (e.g., the first CC 602). In other words, the second CC 604 may ignore the second PCI list 608 that it was configured with.

In some examples, the first CC 602 (e.g., reference CC) may be configured with the first TCI pool 610 but may not be configured with a PCI list. For example, the first CC 602 may be configured for intra-cell BM. Here, if the second CC 704 is configured to borrow the first TCI pool 610 of the first CC 602, then the UE 104 may not expect that the second CC 604 is configured with a PCI list. Alternatively, if the second CC 604 is configured with a PCI list, then the second CC 604 may ignore the PCI list for using the TCI pool from the first CC 602.

FIG. 8 is a flowchart 800 of a method of wireless communication. The method may be performed by a UE (e.g., the UE 104; the apparatus 1302). The method illustrated in FIG. 8 may be performed by the UE in combination with one or more of the steps or blocks illustrated in the flowcharts of FIGS. 9-12.

At 802, the UE may receive, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. For example, 802 may be performed by a receiving component 1340.

At 804, the UE may communicate wireless signaling between the UE and the serving cell via a second CC using the at least one TCI state of the first TCI pool. For example, 804 may be performed by a transmitting component 1342 and a receiving component 1340.

In certain aspects, the second CC is configured for intra-cell beam management (BM), and wherein the first TCI configuration for the first CC configures the first CC for intra-cell BM based on the second CC being configured for intra-cell BM.

In certain aspects, the second CC is configured with a first PCI list enabling inter-cell BM and including a first number of PCI indices, wherein the first TCI configuration further comprises a second PCI list including a second number of PCI indices, wherein the second number of PCI indices is less than or equal to the first number of PCI indices.

In certain aspects, the second CC is configured with a first PCI list enabling inter-cell BM, and wherein the first TCI configuration omits any PCI list based on the second CC being configured with the first PCI list.

In certain aspects, the first TCI configuration comprises multiple TCI pools for the first CC, wherein the multiple TCI pools include a second TCI pool and the first TCI pool.

In certain aspects, the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

In certain aspects, the first TCI configuration further comprises a first PCI list comprising a first PCI of a non-serving cell, and wherein the wireless signaling communicated between the UE and the serving cell via the second CC uses the first TCI pool and the first PCI list.

In certain aspects, the second CC is not configured with a dedicated TCI pool or PCI list.

In certain aspects, the first TCI configuration further comprises a first PCI list comprising a first PCI of a non-serving cell, and wherein the first PCI list omits a second PCI of the serving cell.

FIG. 9 is a flowchart 900 of a method of wireless communication. The method may be performed by a UE (e.g., the UE 104; the apparatus 1302). The method illustrated in FIG. 9 may be performed by the UE in combination with one or more of the steps or blocks illustrated in the flowcharts of FIGS. 8 and 10-12.

At 902, the UE may receive, from the serving cell, a second TCI configuration for the second CC configuring the second CC to use one or more of the first TCI pool and the first PCI list for communication of the wireless signaling. For example, 902 may be performed by the receiving component 1340.

In certain aspects, the first TCI configuration further comprises a first PCI list comprising at least one PCI mapped to the PCI index.

Figure 10:
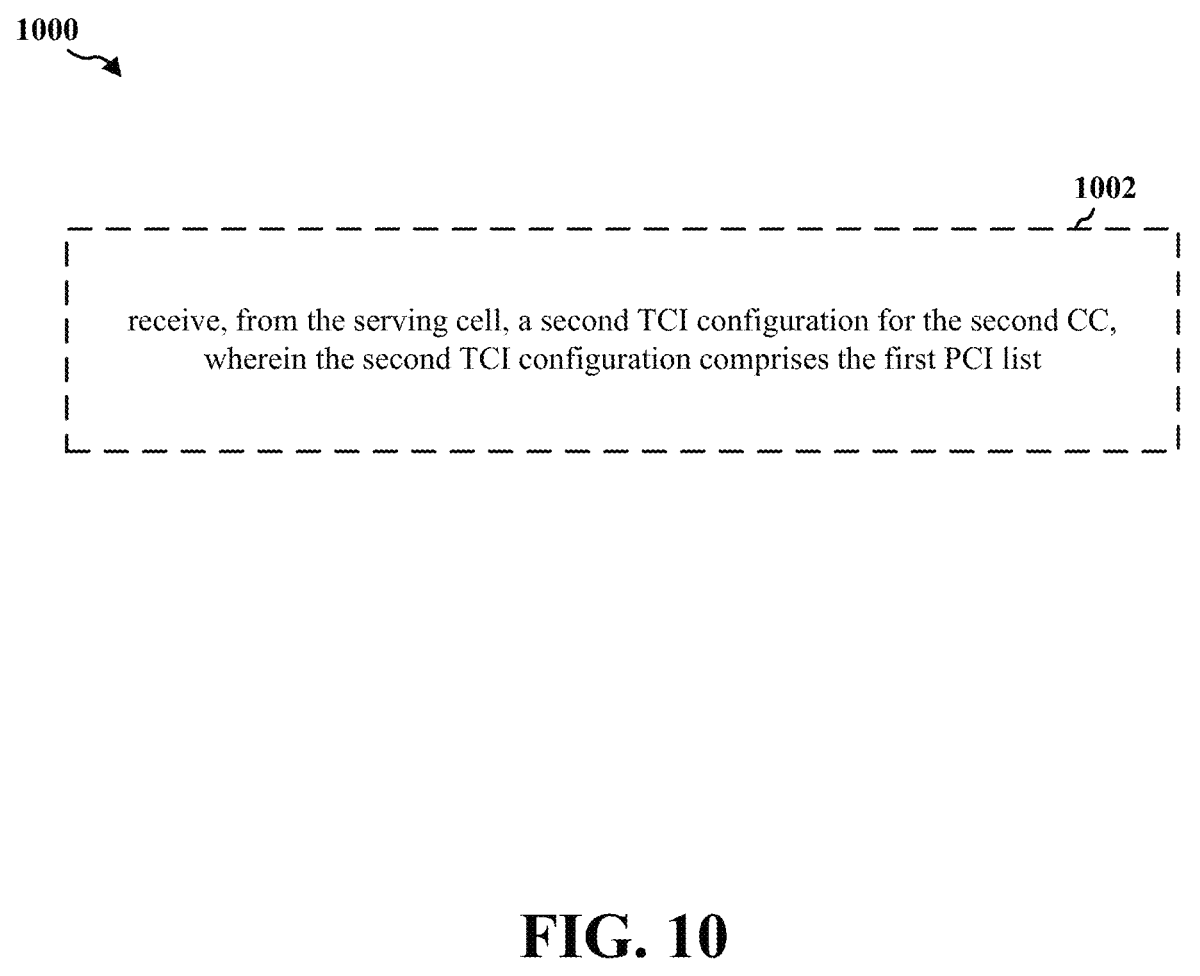

FIG. 10 is a flowchart 1000 of a method of wireless communication. The method may be performed by a UE (e.g., the UE 104; the apparatus 1302). The method illustrated in FIG. 10 may be performed by the UE in combination with one or more of the steps or blocks illustrated in the flowcharts of FIGS. 8, 9, 11, and 12.

At 1002, the UE may receive, from the serving cell, a second TCI configuration for the second CC, wherein the second TCI configuration comprises the first PCI list. For example, 1002 may be performed by the receiving component 1340.

In certain aspects, the first TCI configuration further comprises a first PCI list comprising at least one PCI mapped to the PCI index.

Figure 11:
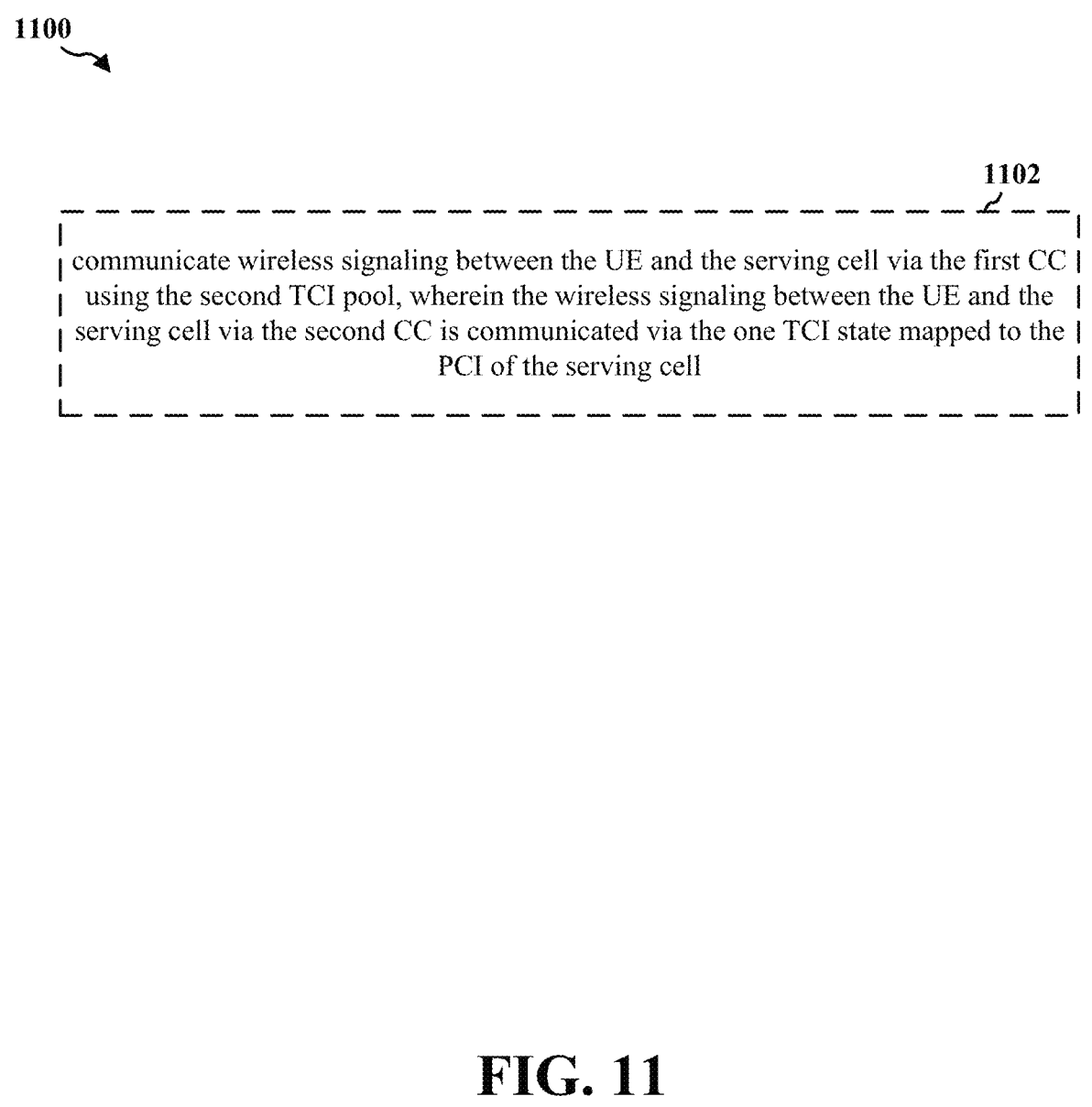

FIG. 11 is a flowchart 1100 of a method of wireless communication. The method may be performed by a UE (e.g., the UE 104; the apparatus 1302). The method illustrated in FIG. 11 may be performed by the UE in combination with one or more of the steps or blocks illustrated in the flowcharts of FIGS. 8-10 and 12.

At 1102, the UE may communicate wireless signaling between the UE and the serving cell via the first CC using the second TCI pool, wherein the wireless signaling between the UE and the serving cell via the second CC is communicated via the one TCI state mapped to the PCI of the serving cell. For example, 1202 may be performed by the receiving component 1340 and the transmitting component 1342.

In certain aspects, the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

FIG. 12 is a flowchart 1200 of a method of wireless communication. The method may be performed by a UE (e.g., the UE 104; the apparatus 1302). The method illustrated in FIG. 12 may be performed by the UE in combination with one or more of the steps or blocks illustrated in the flowcharts of FIGS. 8-11.

At 1202, the UE may configure the second CC with the first TCI pool. For example, 1202 may be performed by a configuring component 1344.

At 1204, the UE may communicate wireless signaling between the UE and the serving cell via a second CC using the at least one TCI state of the first TCI pool. For example, 1202 may be performed by the receiving component 1340 and the transmitting component 1342.

At 1206, the UE may receive, from the serving cell, signaling activating the second TCI state for UE communications, wherein the first TCI state was previously activated. For example, 1206 may be performed by the receiving component 1340.

At 1208, the UE may, if the second CC is configured with a PCI list omitting the second PCI index, or if the second CC is not configured with a PCI list, then continue to communicate wireless signaling between the UE and the serving cell via the second CC using the first TCI state instead of the second TCI state. For example, 1208 may be performed by the receiving component 1340 and the transmitting component 1342.

At 1210, the UE may, if the second CC is configured with a PCI list comprising the second PCI index, then communicate wireless signaling between the UE and the serving cell via the second CC using the second TCI state. For example, 1208 may be performed by the receiving component 1340 and the transmitting component 1342.

In certain aspects, the first TCI configuration further comprises a first PCI list comprising: (i) a first PCI corresponding to a first PCI index mapped to a first TCI state of the first TCI pool, and (ii) a second PCI corresponding to a second PCI index mapped to a second TCI state of the first TCI pool.

Figure 13:
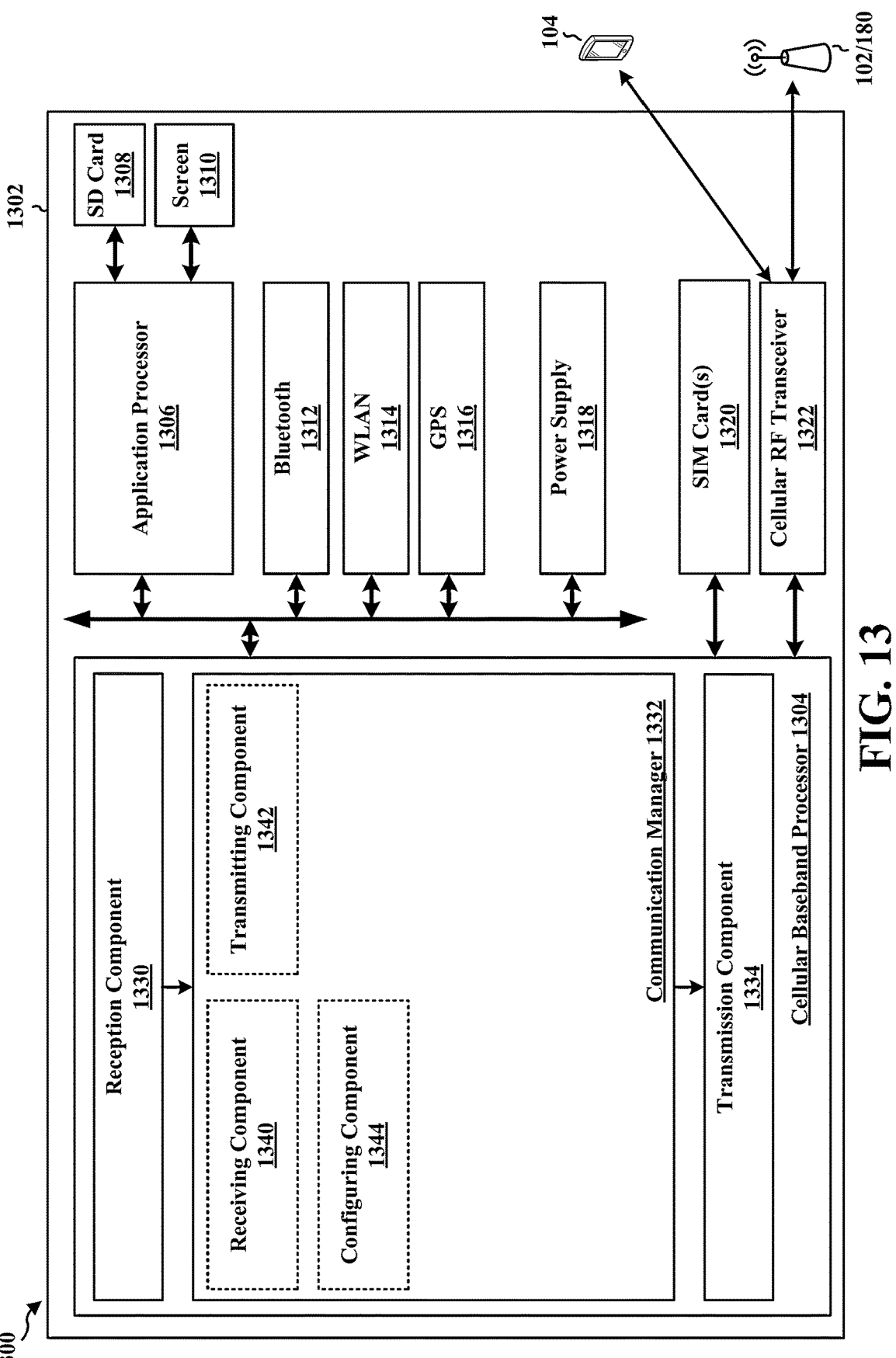
FIG. 13 is a diagram illustrating an example of a hardware implementation for an example UE.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 104 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 104 of FIG. 3) and include the aforediscussed additional modules of the apparatus 1302.

The communication manager 1332 includes a receiving component 1340 that is configured to receive, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; receive, from the serving cell, a second TCI configuration for the second CC configuring the second CC to use one or more of the first TCI pool and the first PCI list for communication of the wireless signaling; receive, from the serving cell, a second TCI configuration for the second CC, wherein the second TCI configuration comprises the first PCI list; and receive, from the serving cell, signaling activating the second TCI state for UE communications, wherein the first TCI state was previously activated; e.g., as described in connection with FIGS. 8-10, and 12.

The communication manager 1332 further includes a transmitting component 1342 configured to communicate wireless signaling between the UE and the serving cell via a second CC using the at least one TCI state of the first TCI pool; communicate wireless signaling between the UE and the serving cell via the first CC using the second TCI pool, wherein the wireless signaling between the UE and the serving cell via the second CC is communicated via the one TCI state mapped to the PCI of the serving cell; communicate wireless signaling between the UE and the serving cell via a second CC using the at least one TCI state of the first TCI pool; if the second CC is configured with a PCI list omitting the second PCI index, or if the second CC is not configured with a PCI list, then continue to communicate wireless signaling between the UE and the serving cell via the second CC using the first TCI state instead of the second TCI state; and if the second CC is configured with a PCI list comprising the second PCI index, then communicate wireless signaling between the UE and the serving cell via the second CC using the second TCI state; e.g., as described in connection with FIGS. 8, 11, and 12. In some examples, the transmitting component 1342 may be used in combination with the receiving component 1340 to perform the aforementioned functions.

The communication manager 1332 further includes a configuring component 1344 configured to configure the second CC with the first TCI pool, e.g., as described in connection with FIG. 12.

The apparatus may include additional components that perform each of the blocks of the algorithm in the aforementioned flowcharts of FIGS. 8-12. As such, each block may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; means for communicating wireless signaling between the UE and the serving cell via a second CC using the at least one TCI state of the first TCI pool; means for receiving, from the serving cell, a second TCI configuration for the second CC configuring the second CC to use one or more of the first TCI pool and the first PCI list for communication of the wireless signaling; means for receiving, from the serving cell, a second TCI configuration for the second CC, wherein the second TCI configuration comprises the first PCI list; means for communicating wireless signaling between the UE and the serving cell via the first CC using the second TCI pool, wherein the wireless signaling between the UE and the serving cell via the second CC is communicated via the one TCI state mapped to the PCI of the serving cell; means for configuring the second CC with the first TCI pool; means for communicating wireless signaling between the UE and the serving cell via a second CC using the at least one TCI state of the first TCI pool; means for receiving, from the serving cell, signaling activating the second TCI state for UE communications, wherein the first TCI state was previously activated; means for continuing to communicate wireless signaling between the UE and the serving cell via the second CC using the first TCI state instead of the second TCI state if the second CC is configured with a PCI list omitting the second PCI index or if the second CC is not configured with a PCI list; means for communicating wireless signaling between the UE and the serving cell via the second CC using the second TCI state if the second CC is configured with a PCI list comprising the second PCI index.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
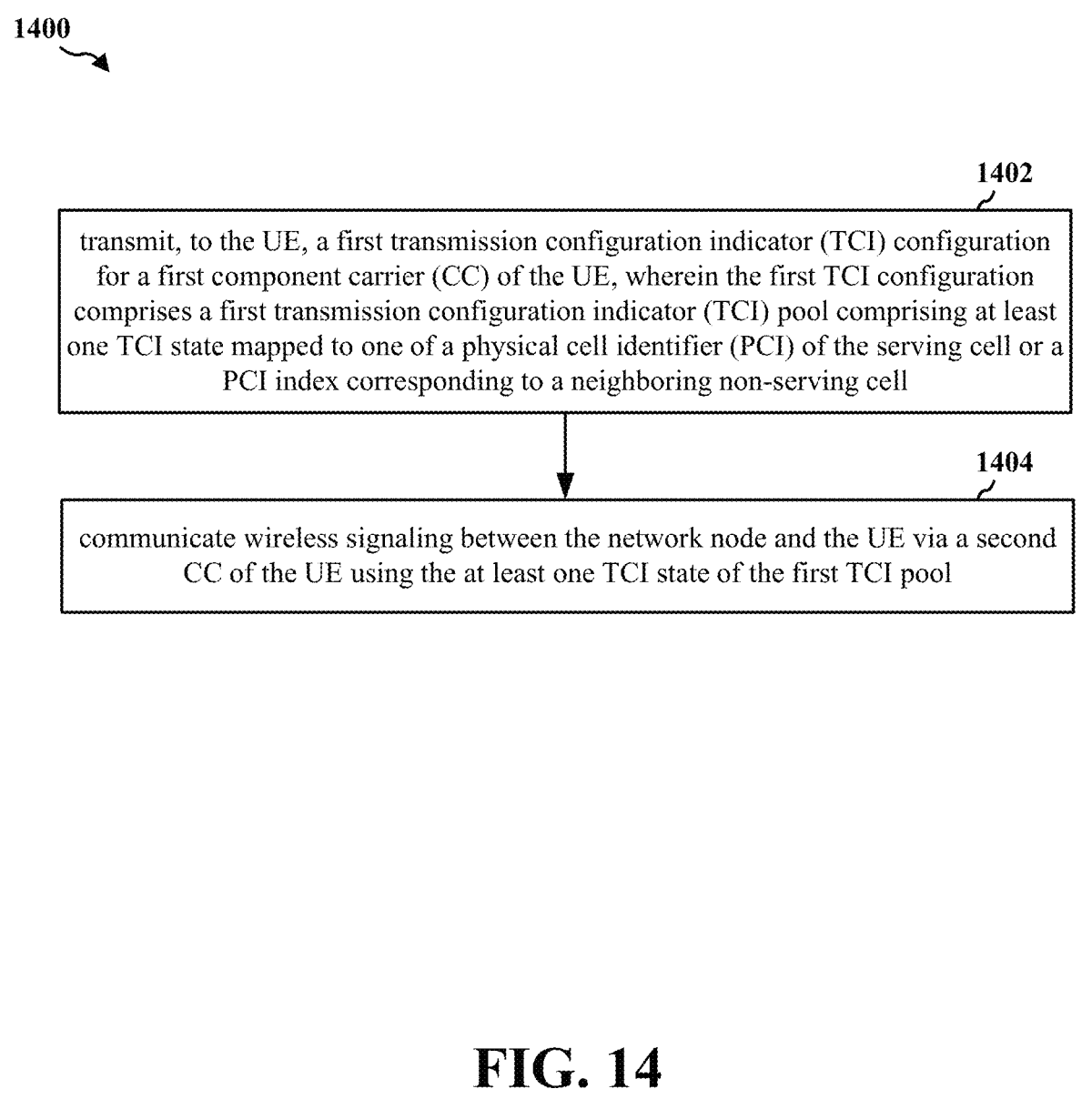

FIG. 14 is a flowchart 1400 of a method of wireless communication. The method may be performed by a network node (e.g., the base station 102/180; the apparatus 2202). The method illustrated in FIG. 14 may be performed by the network node in combination with one or more of the steps or blocks illustrated in the flowcharts of FIGS. 15-21.

At 1402, the network node may transmit, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell. For example, 902 may be performed by a transmitting component 2240.

At 1404, the network node may communicate wireless signaling between the network node and the UE via a second CC of the UE using the at least one TCI state of the first TCI pool. For example, 1404 may be performed by the transmitting component 2240 and a receiving component 2242.

In certain aspects, the first TCI configuration comprises multiple TCI pools for the first CC, wherein the multiple TCI pools include a second TCI pool and the first TCI pool.

In certain aspects, the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

In certain aspects, the first TCI configuration further comprises a first PCI list comprising a first PCI of a non-serving cell, and wherein the wireless signaling communicated between the UE and the serving cell via the second CC uses the first TCI pool and the first PCI list.

In certain aspects, the second CC is not configured with a dedicated TCI pool or PCI list.

Figure 15:
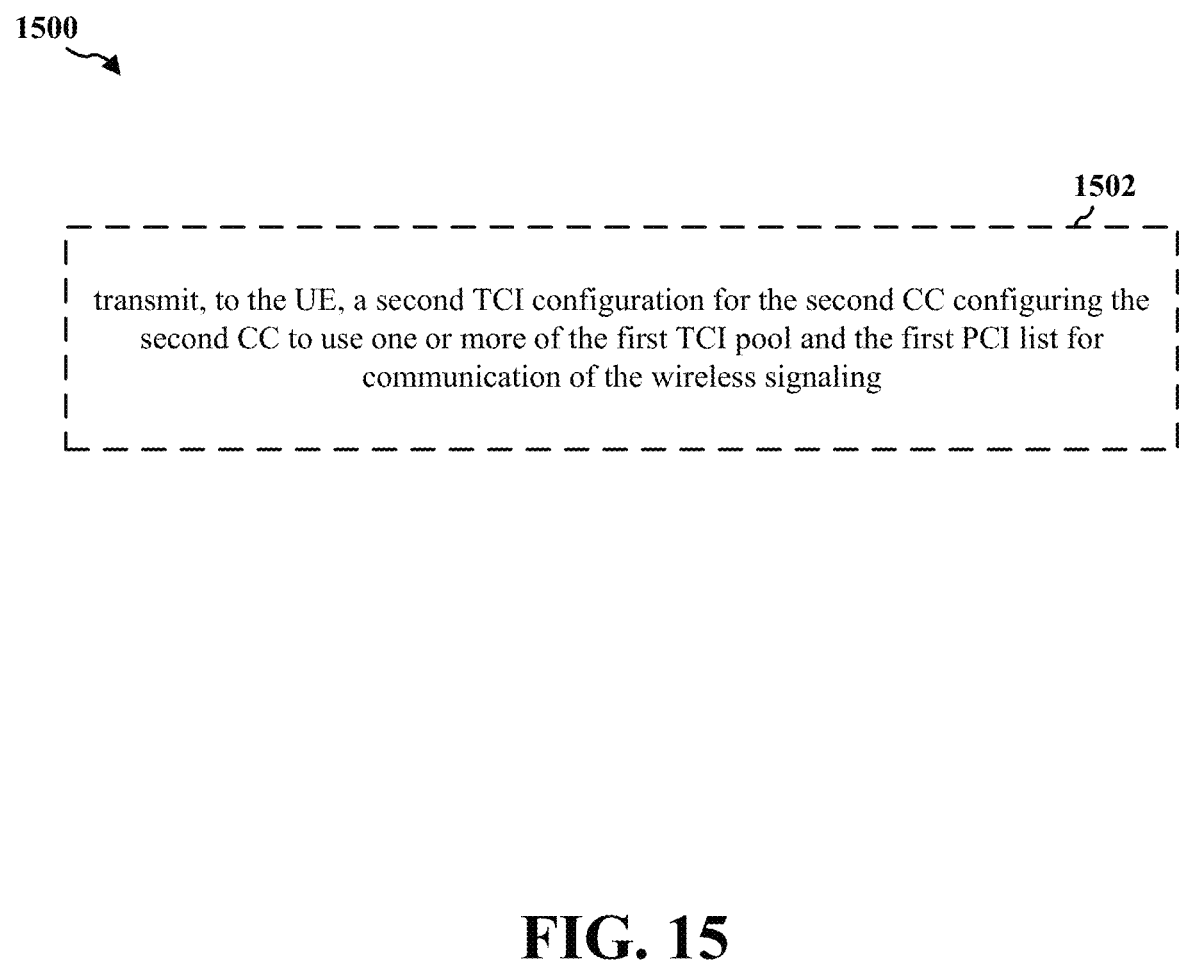

FIG. 15 is a flowchart 1500 of a method of wireless communication. The method may be performed by a network node (e.g., the base station 102/180; the apparatus 2202). The method illustrated in FIG. 15 may be performed by the network node in combination with one or more of the steps or blocks illustrated in the flowcharts of FIGS. 14 and 16-21.

At 1502, the network node may transmit, to the UE, a second TCI configuration for the second CC configuring the second CC to use one or more of the first TCI pool and the first PCI list for communication of the wireless signaling. For example, 1502 may be performed by a transmitting component 2240.

In certain aspects, the first TCI configuration further comprises a first PCI list comprising at least one PCI mapped to the PCI index.

Figure 16:
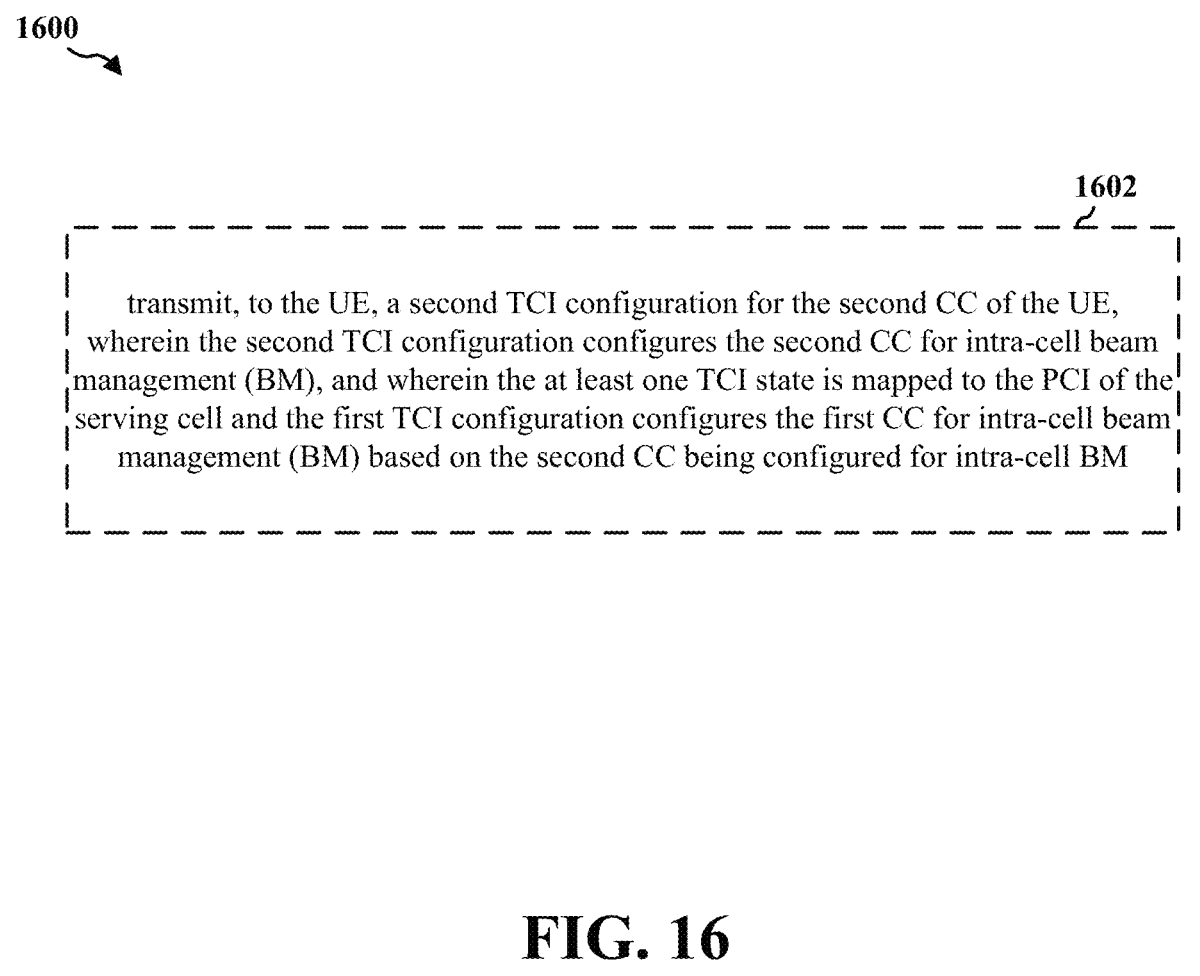

FIG. 16 is a flowchart 1600 of a method of wireless communication. The method may be performed by a network node (e.g., the base station 102/180; the apparatus 2202). The method illustrated in FIG. 16 may be performed by the network node in combination with one or more of the steps or blocks illustrated in the flowcharts of FIGS. 14, 15, and 17-21.

At 1602, the network node may transmit, to the UE, a second TCI configuration for the second CC of the UE, wherein the second TCI configuration configures the second CC for intra-cell beam management (BM), and wherein the at least one TCI state is mapped to the PCI of the serving cell and the first TCI configuration configures the first CC for intra-cell beam management (BM) based on the second CC being configured for intra-cell BM. For example, 1602 may be performed by a transmitting component 2240.

Figure 17:
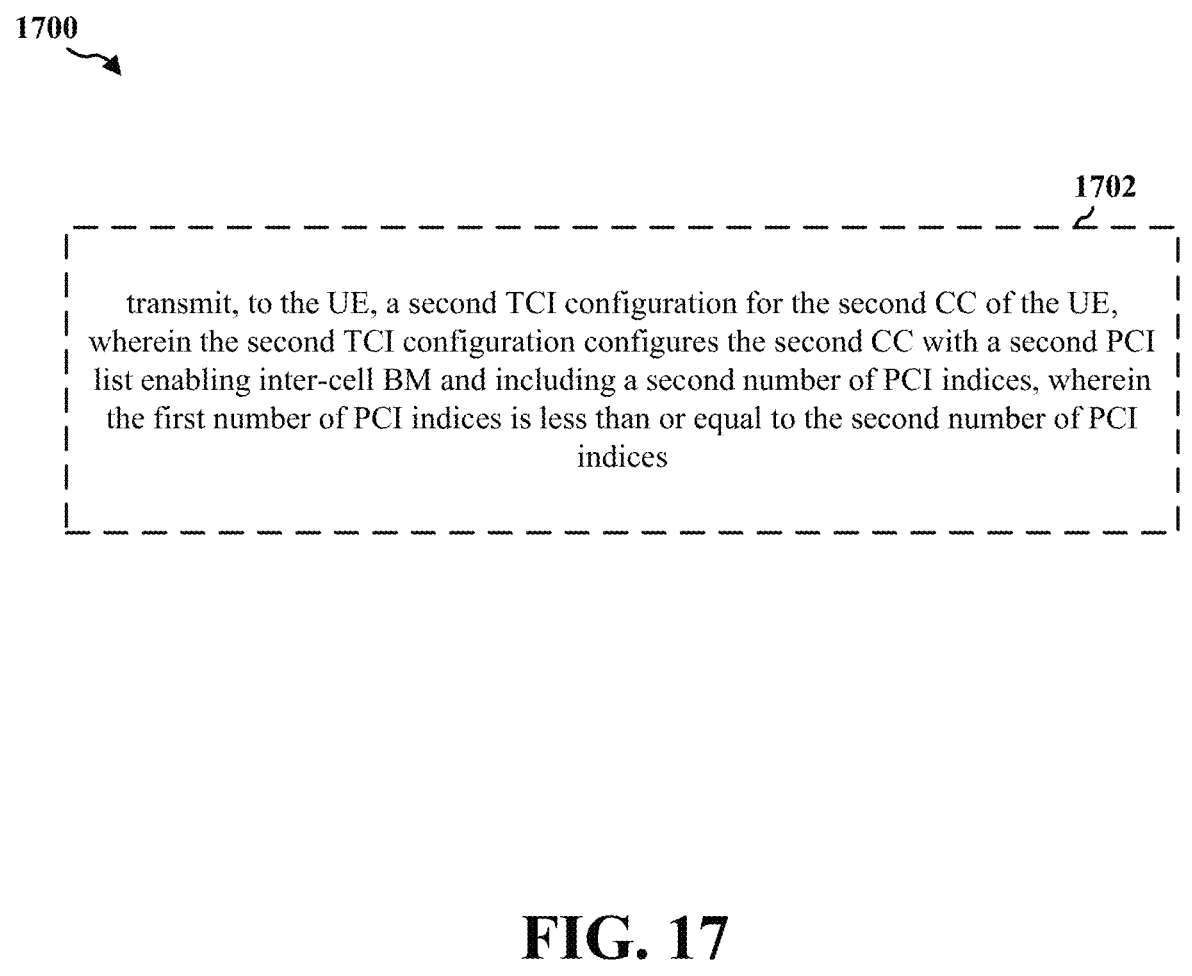

FIG. 17 is a flowchart 1700 of a method of wireless communication. The method may be performed by a network node (e.g., the base station 102/180; the apparatus 2202). The method illustrated in FIG. 17 may be performed by the network node in combination with one or more of the steps or blocks illustrated in the flowcharts of FIGS. 14-16 and 18-21.

At 1702, the network node may transmit, to the UE, a second TCI configuration for the second CC of the UE, wherein the second TCI configuration configures the second CC with a second PCI list enabling inter-cell BM and including a second number of PCI indices, wherein the first number of PCI indices is less than or equal to the second number of PCI indices. For example, 1502 may be performed by a transmitting component 2240.

In certain aspects, the first TCI configuration further comprises a first PCI list including a first number of PCI indices.

Figure 18:
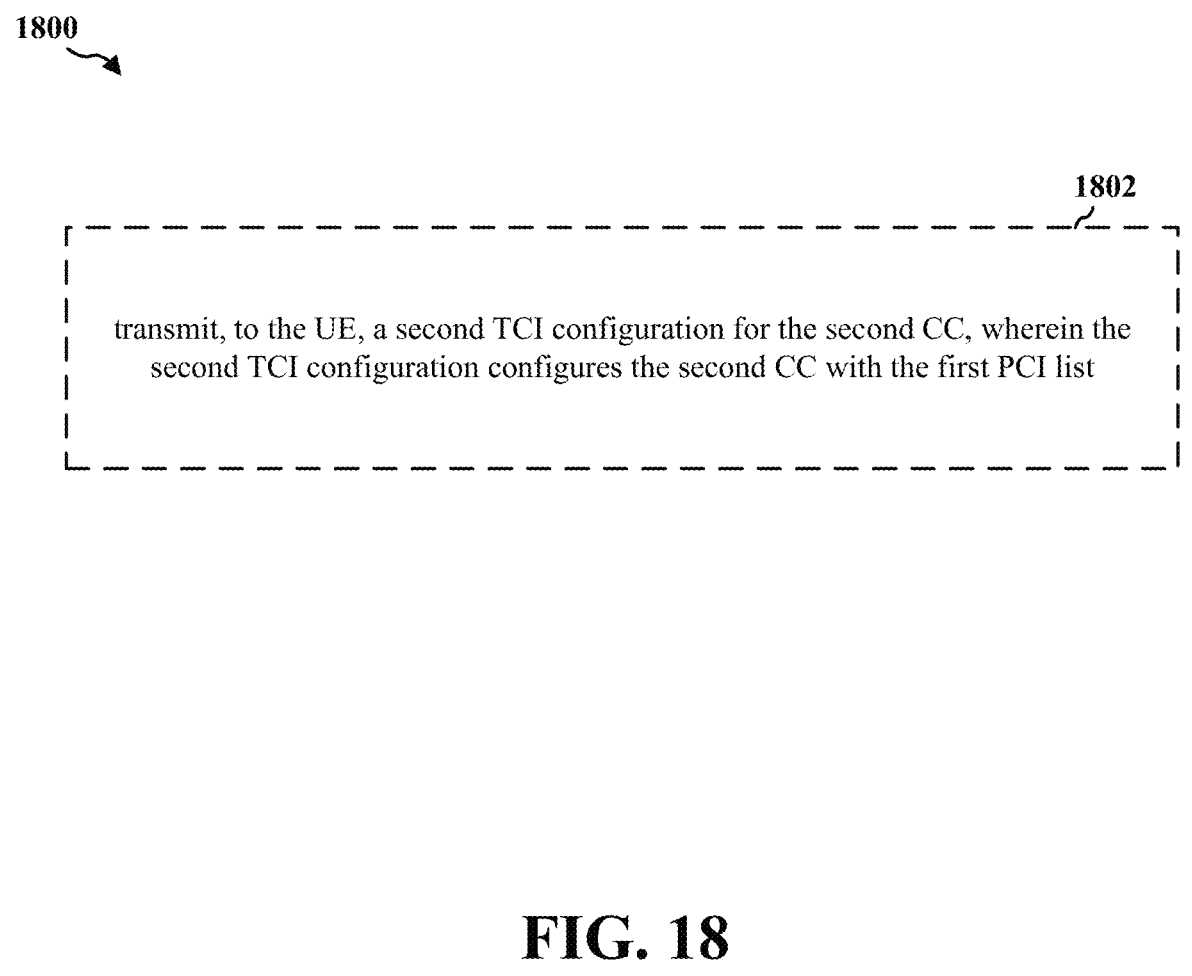

FIG. 18 is a flowchart 1800 of a method of wireless communication. The method may be performed by a network node (e.g., the base station 102/180; the apparatus 2202). The method illustrated in FIG. 18 may be performed by the network node in combination with one or more of the steps or blocks illustrated in the flowcharts of FIGS. 14-17 and 19-21.

At 1802, the network node may transmit, to the UE, a second TCI configuration for the second CC, wherein the second TCI configuration configures the second CC with the first PCI list. For example, 1502 may be performed by a transmitting component 2240.

In certain aspects, the first TCI configuration further comprises a first PCI list comprising at least one PCI mapped to the PCI index.

Figure 19:
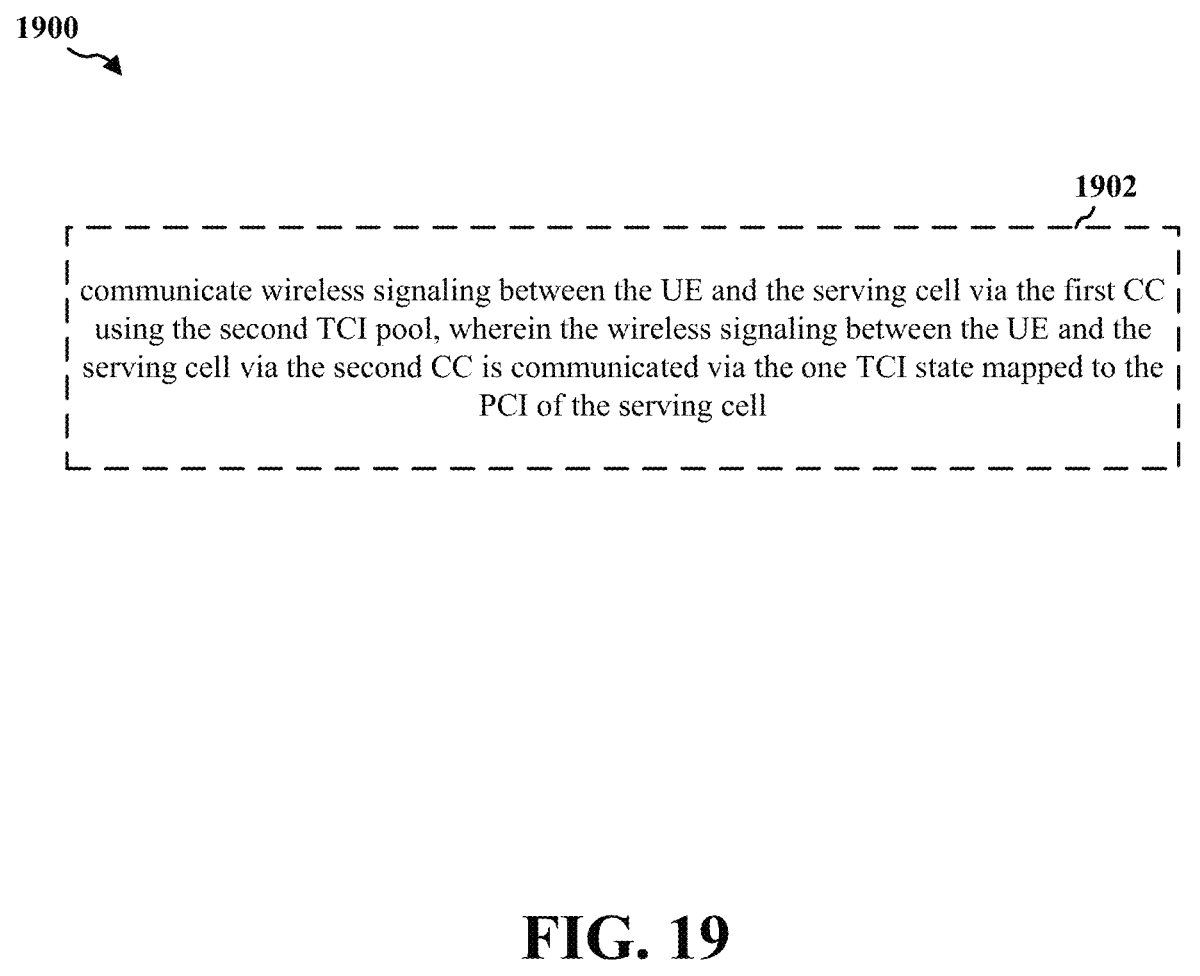

FIG. 19 is a flowchart 1900 of a method of wireless communication. The method may be performed by a network node (e.g., the base station 102/180; the apparatus 2202). The method illustrated in FIG. 19 may be performed by the network node in combination with one or more of the steps or blocks illustrated in the flowcharts of FIGS. 14-18, 20, and 21.

At 1902, the network node may communicate wireless signaling between the UE and the serving cell via the first CC using the second TCI pool, wherein the wireless signaling between the UE and the serving cell via the second CC is communicated via the one TCI state mapped to the PCI of the serving cell. For example, 1902 may be performed by the transmitting component 2240 and the receiving component 2242.

In certain aspects, the first TCI configuration comprises multiple TCI pools for the first CC, wherein the multiple TCI pools include a second TCI pool and the first TCI pool.

In certain aspects, the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

Figure 20:
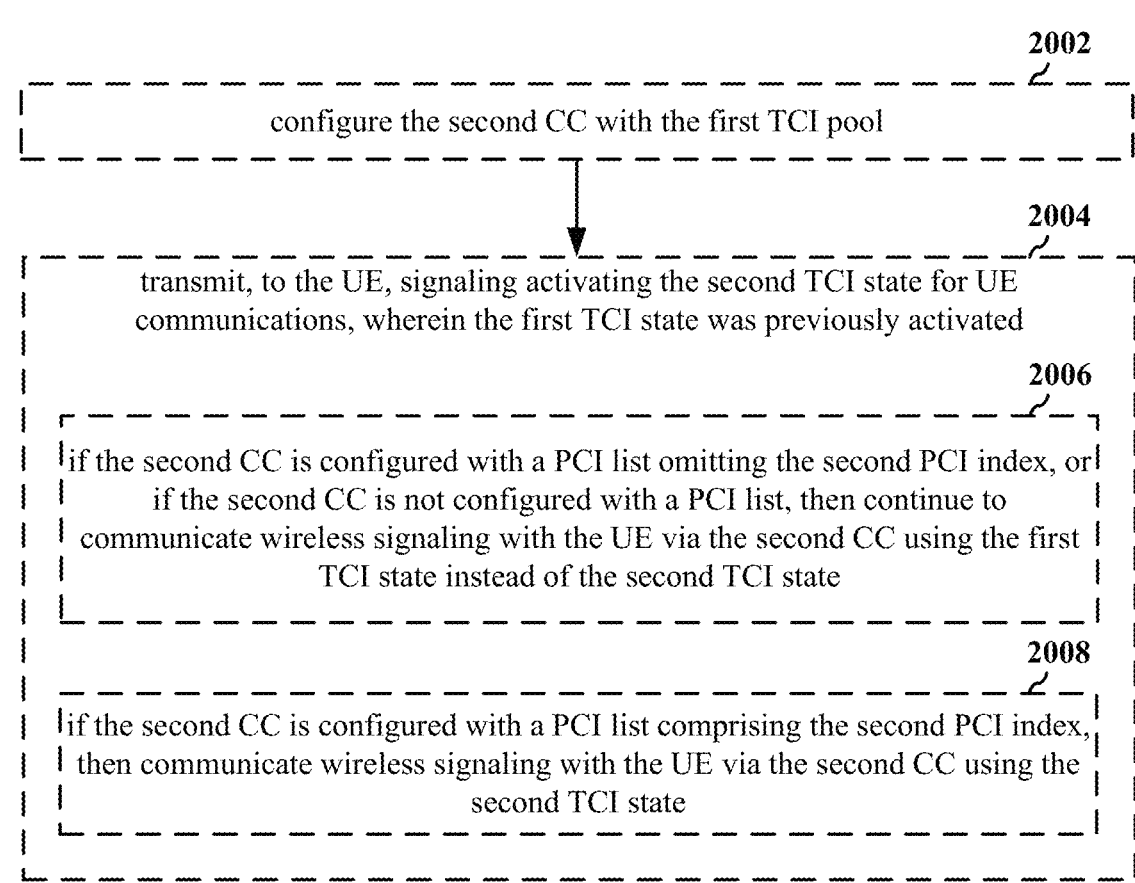

FIG. 20 is a flowchart 2000 of a method of wireless communication. The method may be performed by a network node (e.g., the base station 102/180; the apparatus 2202). The method illustrated in FIG. 20 may be performed by the network node in combination with one or more of the steps or blocks illustrated in the flowcharts of FIGS. 14-19 and 21.

At 2002, the network node may configure the second CC with the first TCI pool. For example, 1902 may be performed by a configuring component 2244.

At 2004, the network node may transmit, to the UE, signaling activating the second TCI state for UE communications, wherein the first TCI state was previously activated. For example, 2004 may be performed by the transmitting component 2240.

At 2006, the UE may, if the second CC is configured with a PCI list omitting the second PCI index, or if the second CC is not configured with a PCI list, then continue to communicate wireless signaling with the UE via the second CC using the first TCI state instead of the second TCI state. For example, 2006 may be performed by the transmitting component 2240 and the receiving component 2242.

At 2008, the UE may, if the second CC is configured with a PCI list comprising the second PCI index, then communicate wireless signaling with the UE via the second CC using the second TCI state. For example, 2006 may be performed by the transmitting component 2240 and the receiving component 2242.

In certain aspects, the first TCI configuration comprises multiple TCI pools for the first CC, wherein the multiple TCI pools include a second TCI pool and the first TCI pool.

FIG. 21 is a flowchart 2100 of a method of wireless communication. The method may be performed by a network node (e.g., the base station 102/180; the apparatus 2202). The method illustrated in FIG. 21 may be performed by the network node in combination with one or more of the steps or blocks illustrated in the flowcharts of FIGS. 14-20.

At 2102, the UE may transmit, to the UE, a second TCI configuration for the second CC comprising a second PCI list, wherein the wireless signaling communicated between the network node and the UE is performed using the first TCI pool and the first PCI list instead of the second PCI list. For example, 2102 may be performed by the transmitting component 2240.

In certain aspects, the second CC is not configured with a dedicated TCI pool, wherein the first TCI configuration further comprises a first PCI list comprising at least one PCI mapped to the PCI index of the first TCI pool.

Figure 22:
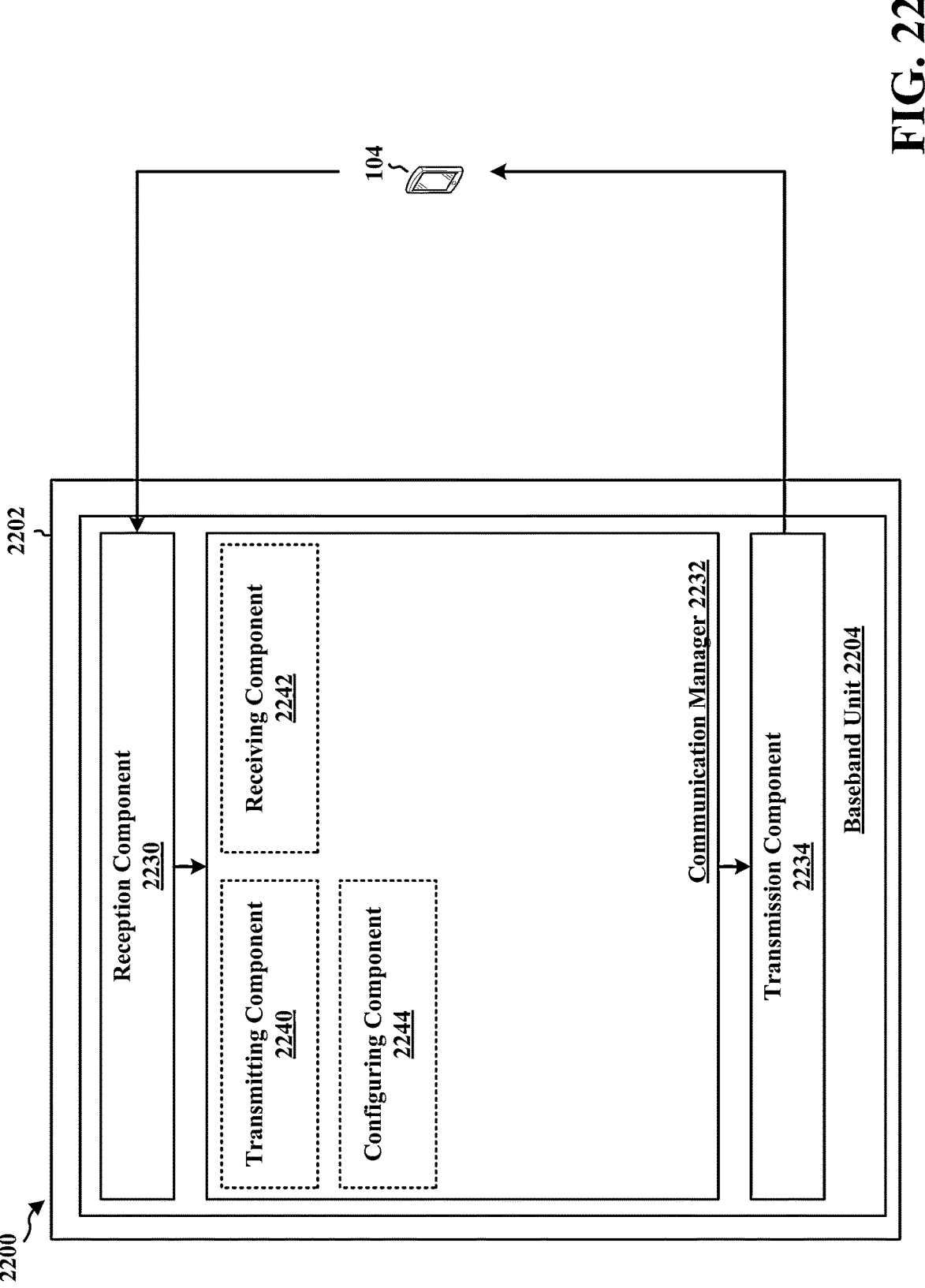
FIG. 22 is a diagram illustrating an example of a hardware implementation for an example base station.

FIG. 22 is a diagram 2200 illustrating an example of a hardware implementation for an apparatus 2202. The apparatus 2202 is a BS and includes a baseband unit 2204. The baseband unit 2204 may communicate through a cellular RF transceiver with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the BS 102/180 and may include the memory 376 and/or at least one of the TX processor 316, the RX processor 370, and the controller/processor 375.

The communication manager 2232 includes a transmitting component 2240 configured to transmit, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; transmit, to the UE, a second TCI configuration for the second CC configuring the second CC to use one or more of the first TCI pool and the first PCI list for communication of the wireless signaling; transmit, to the UE, a second TCI configuration for the second CC of the UE, wherein the second TCI configuration configures the second CC for intra-cell beam management (BM), and wherein the at least one TCI state is mapped to the PCI of the serving cell and the first TCI configuration configures the first CC for intra-cell beam management (BM) based on the second CC being configured for intra-cell BM; transmit, to the UE, a second TCI configuration for the second CC of the UE, wherein the second TCI configuration configures the second CC with a second PCI list enabling inter-cell BM and including a second number of PCI indices, wherein the first number of PCI indices is less than or equal to the second number of PCI indices; transmit, to the UE, a second TCI configuration for the second CC, wherein the second TCI configuration configures the second CC with the first PCI list; transmit, to the UE, signaling activating the second TCI state for UE communications, wherein the first TCI state was previously activated; and transmit, to the UE, a second TCI configuration for the second CC comprising a second PCI list, wherein the wireless signaling communicated between the network node and the UE is performed using the first TCI pool and the first PCI list instead of the second PCI list; e.g., as described in connection with FIGS. 14-21. The communication manager 2232 further includes a receiving component 2242 configured to communicate wireless signaling between the network node and the UE via a second CC of the UE using the at least one TCI state of the first TCI pool; communicate wireless signaling between the UE and the serving cell via the first CC using the second TCI pool, wherein the wireless signaling between the UE and the serving cell via the second CC is communicated via the one TCI state mapped to the PCI of the serving cell; if the second CC is configured with a PCI list omitting the second PCI index, or if the second CC is not configured with a PCI list, then continue to communicate wireless signaling with the UE via the second CC using the first TCI state instead of the second TCI state; and if the second CC is configured with a PCI list comprising the second PCI index, then communicate wireless signaling with the UE via the second CC using the second TCI state; e.g., as described in connection with FIGS. 14 and 20.

The communication manager 2232 further includes a configuring component 2244 configured to configure the second CC with the first TCI pool, e.g., as described in connection with FIG. 21.

The apparatus may include additional components that perform each of the blocks of the algorithm in the aforementioned flowcharts of FIGS. 14-21. As such, each block in the aforementioned flowcharts may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the baseband unit 2204, includes means for transmitting, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; means for communicating wireless signaling between the network node and the UE via a second CC of the UE using the at least one TCI state of the first TCI pool; means for transmitting, to the UE, a second TCI configuration for the second CC configuring the second CC to use one or more of the first TCI pool and the first PCI list for communication of the wireless signaling; means for transmitting, to the UE, a second TCI configuration for the second CC of the UE, wherein the second TCI configuration configures the second CC for intra-cell beam management (BM), and wherein the at least one TCI state is mapped to the PCI of the serving cell and the first TCI configuration configures the first CC for intra-cell beam management (BM) based on the second CC being configured for intra-cell BM; means for transmitting, to the UE, a second TCI configuration for the second CC of the UE, wherein the second TCI configuration configures the second CC with a second PCI list enabling inter-cell BM and including a second number of PCI indices, wherein the first number of PCI indices is less than or equal to the second number of PCI indices; means for transmitting, to the UE, a second TCI configuration for the second CC, wherein the second TCI configuration configures the second CC with the first PCI list; means for communicating wireless signaling between the UE and the serving cell via the first CC using the second TCI pool, wherein the wireless signaling between the UE and the serving cell via the second CC is communicated via the one TCI state mapped to the PCI of the serving cell; means for configuring the second CC with the first TCI pool; means for transmitting, to the UE, signaling activating the second TCI state for UE communications, wherein the first TCI state was previously activated; means for, if the second CC is configured with a PCI list omitting the second PCI index, or if the second CC is not configured with a PCI list, then continue to communicate wireless signaling with the UE via the second CC using the first TCI state instead of the second TCI state; means for, if the second CC is configured with a PCI list comprising the second PCI index, then communicate wireless signaling with the UE via the second CC using the second TCI state; and means for transmitting, to the UE, a second TCI configuration for the second CC comprising a second PCI list, wherein the wireless signaling communicated between the network node and the UE is performed using the first TCI pool and the first PCI list instead of the second PCI list.

The aforementioned means may be one or more of the aforementioned components of the apparatus 2202 configured to perform the functions recited by the aforementioned means. As described supra, the apparatus 2202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C. B and C. or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method of wireless communication at a user equipment (UE), comprising: receiving, from a serving cell, a first transmission configuration indicator (TCI) configuration for a first component carrier (CC), wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; and communicating wireless signaling between the UE and the serving cell via a second CC using the at least one TCI state of the first TCI pool.

Example 2 is the method of example 1, wherein the first TCI configuration further comprises a first PCI list comprising at least one PCI mapped to the PCI index, and wherein the method further comprises: receiving, from the serving cell, a second TCI configuration for the second CC configuring the second CC to use one or more of the first TCI pool and the first PCI list for communication of the wireless signaling.

Example 3 is the method of any of examples 1 and 2, wherein the second CC is configured for intra-cell beam management (BM), and wherein the first TCI configuration for the first CC configures the first CC for intra-cell BM based on the second CC being configured for intra-cell BM.

Example 4 is the method of any of examples 1-3, wherein the second CC is configured with a first PCI list enabling inter-cell BM and including a first number of PCI indices, wherein the first TCI configuration further comprises a second PCI list including a second number of PCI indices, wherein the second number of PCI indices is less than or equal to the first number of PCI indices.

Example 5 is the method of any of examples 1-4, wherein the second CC is configured with a first PCI list enabling inter-cell BM, and wherein the first TCI configuration omits any PCI list based on the second CC being configured with the first PCI list.

Example 6 is the method of any of examples 1-5, wherein the first TCI configuration further comprises a first PCI list comprising at least one PCI mapped to the PCI index, and wherein the method further comprises: receiving, from the serving cell, a second TCI configuration for the second CC, wherein the second TCI configuration comprises the first PCI list.

Example 7 is the method of any of examples 1-6, wherein the first TCI configuration comprises multiple TCI pools for the first CC, wherein the multiple TCI pools include a second TCI pool and the first TCI pool.

Example 8 is the method of example 7, wherein the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

Example 9 is the method of example 8, wherein the method further comprises: communicating wireless signaling between the UE and the serving cell via the first CC using the second TCI pool, wherein the wireless signaling between the UE and the serving cell via the second CC is communicated via the one TCI state mapped to the PCI of the serving cell.

Example 10 is the method of any of examples 1-9, wherein the first TCI configuration further comprises a first PCI list comprising: (i) a first PCI corresponding to a first PCI index mapped to a first TCI state of the first TCI pool, and (ii) a second PCI corresponding to a second PCI index mapped to a second TCI state of the first TCI pool, and wherein the method further comprises: configuring the second CC with the first TCI pool.

Example 11 is the method of example 10, wherein the method further comprises: receiving, from the serving cell, signaling activating the second TCI state for UE communications, wherein the first TCI state was previously activated; and if the second CC is configured with a PCI list omitting the second PCI index, or if the second CC is not configured with a PCI list, then continuing to communicate wireless signaling between the UE and the serving cell via the second CC using the first TCI state instead of the second TCI state; or if the second CC is configured with a PCI list comprising the second PCI index, then communicating wireless signaling between the UE and the serving cell via the second CC using the second TCI state.

Example 12 is the method of any of examples 1-11, wherein the first TCI configuration further comprises a first PCI list comprising a first PCI of a non-serving cell, and wherein the wireless signaling communicated between the UE and the serving cell via the second CC uses the first TCI pool and the first PCI list.

Example 13 is the method of example 12, wherein the second CC is not configured with a dedicated TCI pool or PCI list.

Example 14 is the method of any of examples 1-13, wherein the first TCI configuration further comprises a first PCI list comprising a first PCI of a non-serving cell, and wherein the first PCI list omits a second PCI of the serving cell.

Example 15 is the method of any of examples 1-14, wherein the second CC is not configured with a dedicated TCI pool, wherein the first TCI configuration further comprises a first PCI list comprising at least one PCI mapped to the PCI index of the first TCI pool, and wherein the method further comprises: receiving a second TCI configuration for the second CC comprising a second PCI list, wherein the wireless signaling communicated between the UE and the serving cell is performed using the first TCI pool and the first PCI list instead of the second PCI list.

Example 16 is the method of wireless communication at a network node configured as a serving cell for a user equipment (UE), comprising: transmitting, to the UE, a first transmission configuration indicator (TCI) configuration for a first component carrier (CC) of the UE, wherein the first TCI configuration comprises a first transmission configuration indicator (TCI) pool comprising at least one TCI state mapped to one of a physical cell identifier (PCI) of the serving cell or a PCI index corresponding to a neighboring non-serving cell; and communicating wireless signaling between the network node and the UE via a second CC of the UE using the at least one TCI state of the first TCI pool.

Example 17 is the method of example 16, wherein the first TCI configuration further comprises a first PCI list comprising at least one PCI mapped to the PCI index, and wherein the method further comprises: transmitting, to the UE, a second TCI configuration for the second CC configuring the second CC to use one or more of the first TCI pool and the first PCI list for communication of the wireless signaling.

Example 18 is the method of any of examples 16 and 17, wherein the method further comprises: transmitting, to the UE, a second TCI configuration for the second CC of the UE, wherein the second TCI configuration configures the second CC for intra-cell beam management (BM), and wherein the at least one TCI state is mapped to the PCI of the serving cell and the first TCI configuration configures the first CC for intra-cell beam management (BM) based on the second CC being configured for intra-cell BM.

Example 19 is the method of any of examples 16-18, wherein the first TCI configuration further comprises a first PCI list including a first number of PCI indices, and wherein the method further comprises: transmitting, to the UE, a second TCI configuration for the second CC of the UE, wherein the second TCI configuration configures the second CC with a second PCI list enabling inter-cell BM and including a second number of PCI indices, wherein the first number of PCI indices is less than or equal to the second number of PCI indices.

Example 20 is the method of any of examples 16-19, wherein the first TCI configuration further comprises a first PCI list comprising at least one PCI mapped to the PCI index, and wherein the method further comprises: transmitting, to the UE, a second TCI configuration for the second CC, wherein the second TCI configuration configures the second CC with the first PCI list.

Example 21 is the method of any of examples 16-20, wherein the first TCI configuration comprises multiple TCI pools for the first CC, wherein the multiple TCI pools include a second TCI pool and the first TCI pool.

Example 22 is the method of example 21, wherein the first TCI pool is configured for intra-cell beam management (BM) and comprises at least one TCI state mapped to the PCI of the serving cell, and wherein the second TCI pool is configured for inter-cell BM and comprises at least one TCI state mapped to the PCI index corresponding to the neighboring non-serving cell.

Example 23 is the method of example 22, wherein the method further comprises: communicating wireless signaling between the UE and the serving cell via the first CC using the second TCI pool, wherein the wireless signaling between the UE and the serving cell via the second CC is communicated via the one TCI state mapped to the PCI of the serving cell.

Example 24 is the method of any of examples 16-23, wherein the first TCI configuration further comprises a first PCI list comprising: (i) a first PCI corresponding to a first PCI index mapped to a first TCI state of the first TCI pool, and (ii) a second PCI corresponding to a second PCI index mapped to a second TCI state of the first TCI pool, and wherein the method further comprises: configuring the second CC with the first TCI pool.

Example 25 is the method of example 24, wherein the method further comprises: transmitting, to the UE, signaling activating the second TCI state for UE communications, wherein the first TCI state was previously activated; and if the second CC is configured with a PCI list omitting the second PCI index, or if the second CC is not configured with a PCI list, then continuing to communicate wireless signaling with the UE via the second CC using the first TCI state instead of the second TCI state; or if the second CC is configured with a PCI list comprising the second PCI index, then communicating wireless signaling with the UE via the second CC using the second TCI state.

Example 26 is the method of any of examples 16-25, wherein the first TCI configuration further comprises a first PCI list comprising a first PCI of a non-serving cell, and wherein the wireless signaling communicated between the UE and the serving cell via the second CC uses the first TCI pool and the first PCI list.

Example 27 is the method of example 26, wherein the second CC is not configured with a dedicated TCI pool or PCI list.

Example 28 is the method of any of examples 16-27, wherein the second CC is not configured with a dedicated TCI pool, wherein the first TCI configuration further comprises a first PCI list comprising at least one PCI mapped to the PCI index of the first TCI pool, and wherein the method further comprises: transmitting, to the UE, a second TCI configuration for the second CC comprising a second PCI list, wherein the wireless signaling communicated between the network node and the UE is performed using the first TCI pool and the first PCI list instead of the second PCI list.

Example 29 is a UE, comprising: a memory comprising instructions; and one or more processors configured to execute the instructions to cause the UE to perform a method in accordance with any one of examples 1-15.

Example 30 is a network node, comprising: a memory comprising instructions; and one or more processors configured to execute the instructions and cause the network node to perform a method in accordance with any one of examples 16-28.

Example 31 is an apparatus for wireless communications, comprising means for performing a method in accordance with any one of examples 1-15.

Example 32 is an apparatus for wireless communications, comprising means for performing a method in accordance with any one of examples 16-28.

Example 33 is a non-transitory computer-readable medium comprising instructions that, when executed by an apparatus, cause the apparatus to perform a method in accordance with any one of examples 1-15.

Example 34 is a non-transitory computer-readable medium comprising instructions that, when executed by an apparatus, cause the apparatus to perform a method in accordance with any one of examples 16-28.

What is claimed is:

1. A user equipment (UE) configured for wireless communication, comprising:

a memory comprising instructions; and one or more processors configured to execute the instructions and cause the UE to:

receive, from a serving cell, a first transmission configuration indicator (TCI) configuration associated with a first component carrier (CC), wherein the first TCI configuration comprises a first TCI pool comprising: an indication of a first TCI state, an indication of a first physical cell identifier (PCI) index associated with the serving cell, an indication of a mapping between the first TCI state and the first PCI index, an indication of a second TCI state, an indication of a second PCI index associated with a neighboring non-serving cell, and an indication of a mapping between the second TCI state and the second PCI index, wherein the first TCI configuration further comprises a first PCI list including a first number of PCI indices; and communicate wireless signaling between the UE and the serving cell via a second CC using the first TCI state of the first TCI pool, wherein the second CC is configured with a second PCI list enabling inter-cell beam management (BM) and including a second number of PCI indices, wherein the first number of PCI indices is less than the second number of PCI indices, and wherein the first TCI state is used to communicate the wireless signaling via the second CC based on the UE not being configured with a TCI pool associated with the second CC.

2. The UE of claim 1, wherein the one or more processors are further configured to cause the UE to:

receive, from the serving cell, a second TCI configuration for the second CC configuring the second CC to use the first TCI pool for a future communication of wireless signaling.

3. The UE of claim 1, wherein the first TCI configuration further comprises the first PCI list comprising at least one PCI mapped to the second PCI index, and wherein the one or more processors are further configured to cause the UE to:

receive, from the serving cell, a second TCI configuration for the second CC, wherein the second TCI configuration comprises the second PCI list.

4. The UE of claim 1, wherein the first TCI configuration comprises multiple TCI pools for the first CC, wherein the multiple TCI pools include a second TCI pool and the first TCI pool.

5. The UE of claim 4, wherein the second TCI pool is configured for intra-cell beam management (BM) and comprises at least one TCI state mapped to the first PCI index of the serving cell, and wherein the first TCI pool is configured for inter-cell BM and comprises at least one TCI state mapped to the second PCI index corresponding to the neighboring non-serving cell.

6. The UE of claim 5, wherein the one or more processors are further configured to cause the UE to:

communicate the wireless signaling between the UE and the serving cell via the first CC using the first TCI pool, wherein the wireless signaling between the UE and the serving cell via the second CC is communicated via the first TCI state mapped to the first PCI index of the serving cell.

7. The UE of claim 1, wherein the first TCI configuration further comprises the first PCI list comprising: (i) a first PCI corresponding to the first PCI index mapped to the first TCI state of the first TCI pool, and (ii) a second PCI corresponding to the second PCI index mapped to the second TCI state of the first TCI pool, and wherein the one or more processors are further configured to cause the UE to:

configure the second CC with the first TCI pool.

8. The UE of claim 7, wherein the one or more processors are further configured to cause the UE to:

receive, from the serving cell, signaling activating the second TCI state for UE communications, wherein the first TCI state was previously activated; and if the second CC is configured with the second PCI list omitting the second PCI index, then continue to communicate the wireless signaling between the UE and the serving cell via the second CC using the first TCI state instead of the second TCI state; or if the second CC is configured with the second PCI list comprising the second PCI index, then communicate wireless signaling between the UE and the serving cell via the second CC using the second TCI state.

9. The UE of claim 1, wherein the first TCI configuration further comprises the first PCI list comprising a first PCI of a non-serving cell, and wherein the wireless signaling communicated between the UE and the serving cell via the second CC uses the first TCI pool and the first PCI list.

10. The UE of claim 9, wherein the second CC is not configured with a dedicated TCI pool.

11. The UE of claim 1, wherein the first TCI configuration further comprises the first PCI list comprising a first PCI of a non-serving cell, and wherein the first PCI list omits a second PCI of the serving cell.

12. The UE of claim 1, wherein the second CC is not configured with a dedicated TCI pool, wherein the first TCI configuration further comprises the first PCI list comprising a first PCI mapped to the first PCI index of the first TCI pool, and wherein the one or more processors are further configured to cause the UE to:

receive a second TCI configuration for the second CC comprising the second PCI list, wherein the wireless signaling communicated between the UE and the serving cell is performed using the first TCI pool and the first PCI list instead of the second PCI list.

13. A network node configured as a serving cell for wireless communication with a user equipment (UE), comprising:

a memory comprising instructions; and one or more processors configured to execute the instructions and cause the network node to:

transmit, to the UE, a first transmission configuration indicator (TCI) configuration associated with a first component carrier (CC) of the UE, wherein the first TCI configuration comprises a first TCI pool comprising: an indication of a first TCI state, an indication of a first physical cell identifier (PCI) index associated with the serving cell, an indication of a mapping between the first TCI state and the first PCI index, an indication of a second TCI state, an indication of a second PCI index associated with a neighboring non-serving cell, and an indication of a mapping between the second TCI state and the second PCI index, wherein the first TCI configuration further comprises a first PCI list including a first number of PCI indices;

transmit, to the UE, a second TCI configuration for a second CC of the UE; and communicate wireless signaling between the network node and the UE via the second CC of the UE using the first TCI state of the first TCI pool, wherein the second TCI configuration configures the second CC with a second PCI list enabling inter-cell beam management (BM) and including a second number of PCI indices, wherein the first number of PCI indices is less than the second number of PCI indices, and wherein the first TCI state is used to communicate the wireless signaling via the second CC based on the UE not being configured with a TCI pool associated with the second CC.

14. The network node of claim 13, wherein the one or more processors are further configured to cause the network node to:

transmit, to the UE, the second TCI configuration for the second CC configuring the second CC to use the first TCI pool for a future communication of wireless signaling.

15. The network node of claim 13, wherein the first TCI configuration further comprises the first PCI list comprising at least one PCI mapped to the second PCI index, and wherein the one or more processors are further configured to cause the network node to:

transmit, to the UE, the second TCI configuration for the second CC, wherein the second TCI configuration comprises the second PCI list.

16. The network node of claim 13, wherein the first TCI configuration comprises multiple TCI pools for the first CC, wherein the multiple TCI pools include a second TCI pool and the first TCI pool.

17. The network node of claim 16, wherein the second TCI pool is configured for intra-cell beam management (BM) and comprises at least one TCI state mapped to the first PCI index of the serving cell, and wherein the first TCI pool is configured for inter-cell BM and comprises at least one TCI state mapped to the second PCI index corresponding to the neighboring non-serving cell.

18. The network node of claim 17, wherein the one or more processors are further configured to cause the network node to:

communicate the wireless signaling between the UE and the serving cell via the first CC using the first TCI pool, wherein the wireless signaling between the UE and the serving cell via the second CC is communicated via the first TCI state mapped to the first PCI index of the serving cell.

19. The network node of claim 13, wherein the first TCI configuration further comprises the first PCI list comprising: (i) a first PCI corresponding to the first PCI index mapped to the first TCI state of the first TCI pool, and (ii) a second PCI corresponding to the second PCI index mapped to the second TCI state of the first TCI pool, and wherein the second CC is configured with the first TCI pool.

20. The network node of claim 19, wherein the one or more processors are further configured to cause the network node to:

transmit, to the UE, signaling activating the second TCI state for UE communications, wherein the first TCI state was previously activated; and if the second CC is configured with the second PCI list omitting the second PCI index, then continue to communicate the wireless signaling with the UE via the second CC using the first TCI state instead of the second TCI state; or if the second CC is configured with the second PCI list comprising the second PCI index, then communicate wireless signaling with the UE via the second CC using the second TCI state.

21. The network node of claim 13, wherein the first TCI configuration further comprises the first PCI list comprising a first PCI of a non-serving cell, and wherein the wireless signaling communicated between the UE and the serving cell via the second CC uses the first TCI pool and the first PCI list.

22. The network node of claim 21, wherein the second CC is not configured with a dedicated TCI pool.

23. The network node of claim 13, wherein the second CC is not configured with a dedicated TCI pool, wherein the first TCI configuration further comprises the first PCI list comprising a first PCI mapped to the first PCI index of the first TCI pool, and wherein the one or more processors are further configured to cause the network node to:

transmit, to the UE, the second TCI configuration for the second CC comprising the second PCI list, wherein the wireless signaling communicated between the network node and the UE is performed using the first TCI pool and the first PCI list instead of the second PCI list.

24. A method of wireless communication at a user equipment (UE), comprising:

receiving, from a serving cell, a first transmission configuration indicator (TCI) configuration associated with a first component carrier (CC), wherein the first TCI configuration comprises a first TCI pool comprising: an indication of a first TCI state, an indication of a first physical cell identifier (PCI) index associated with the serving cell, an indication of a mapping between the first TCI state and the first PCI index, an indication of a second TCI state, an indication of a second PCI index associated with a neighboring non-serving cell, and an indication of a mapping between the second TCI state and the second PCI index, wherein the first TCI configuration further comprises a first PCI list including a first number of PCI indices; and communicating wireless signaling between the UE and the serving cell via a second CC using the first TCI state of the first TCI pool, wherein the second CC is configured with a second PCI list enabling inter-cell beam management (BM) and including a second number of PCI indices, wherein the first number of PCI indices is less than the second number of PCI indices, and wherein the first TCI state is used to communicate the wireless signaling via the second CC based on the UE not being configured with a TCI pool associated with the second CC.

25. A method of wireless communication at a network node configured as a serving cell for a user equipment (UE), comprising:

transmitting, to the UE, a first transmission configuration indicator (TCI) configuration associated with a first component carrier (CC) of the UE, wherein the first TCI configuration comprises a first TCI pool comprising: an indication of a first TCI state, an indication of a first physical cell identifier (PCI) index associated with the serving cell, an indication of a mapping between the first TCI state and the first PCI index, an indication of a second TCI state, an indication of a second PCI index associated with a neighboring non-serving cell, and an indication of a mapping between the second TCI state and the second PCI index, wherein the first TCI configuration further comprises a first PCI list including a first number of PCI indices;

transmit, to the UE, a second TCI configuration for a second CC of the UE; and communicating wireless signaling between the network node and the UE via the second CC of the UE using the first TCI state of the first TCI pool, wherein the second TCI configuration configures the second CC with a second PCI list enabling inter-cell beam management (BM) and including a second number of PCI indices, wherein the first number of PCI indices is less than the second number of PCI indices, and wherein the first TCI state is used to communicate the wireless signaling via the second CC based on the UE not being configured with a TCI pool associated with the second CC.

* * * * *